United States Patent [19]

Ito et al.

[11] Patent Number: 5,525,849
[45] Date of Patent: Jun. 11, 1996

[54] SUPERCONDUCTING BEARING

[75] Inventors: Norio Ito; Tatsuya Shimoda; Hiroshi Imaizumi, all of Suwa; Hiromasa Higasa; Fumihiko Ishikawa, both of Takamatsu, all of Japan

[73] Assignees: Seiko Epson Corporation, Tokyo; Shikoku Research Institute Inc., Kagawa, both of Japan

[21] Appl. No.: 284,680

[22] PCT Filed: Feb. 10, 1993

[86] PCT No.: PCT/JP93/00172

§ 371 Date: Aug. 9, 1994

§ 102(e) Date: Aug. 9, 1994

[87] PCT Pub. No.: WO93/16294

PCT Pub. Date: Aug. 19, 1993

[30] Foreign Application Priority Data

Feb. 14, 1992 [JP] Japan .................................. 4-027587

[51] Int. Cl.⁶ .................................................. H02K 7/09
[52] U.S. Cl. ........................ 310/90.5; 505/877; 505/166
[58] Field of Search ........................ 310/90.5; 384/626; 335/216; 505/166, 876, 877, 903

[56] References Cited

U.S. PATENT DOCUMENTS

| | | | |
|---|---|---|---|
| 5,126,317 | 6/1992 | Agarwala | 505/1 |
| 5,177,387 | 1/1993 | McMichael et al. | 310/90.5 |
| 5,196,748 | 3/1993 | Rigney | 310/90.5 |
| 5,245,270 | 9/1993 | Akiyama | 322/4 |
| 5,270,601 | 12/1993 | Rigney | 310/90.5 |
| 5,313,130 | 5/1994 | Shibayama et al. | 310/90.5 |
| 5,330,967 | 7/1994 | Takahata et al. | 505/166 |
| 5,389,909 | 2/1995 | Havens | 335/216 |

Primary Examiner—Thomas M. Dougherty
Attorney, Agent, or Firm—Kanesaka & Takeuchi

[57] ABSTRACT

A superconducting bearing comprises a rotating member A and a fixed member B, one of which is provided with a superconducting member (5) while the other is provided with a magnet (8). The superconducting member (5) includes a superconductor (4) for floating the magnet (8) and a support (3) for supporting the superconductor (4). The magnet (8) includes a ring-like magnet (11) which is coaxial with the axis of the rotary member A, and the ring-like magnet (11) and the superconductor member (5) are so disposed as to face each other with a gap between them. A magnetic flux diffusion member (13) is disposed on the surface of the ring-like magnet (11) opposed to the superconductor (5). The ring-like magnet (11) comprises two ring-like magnets (11A and 11B) having mutually different diameters, and the ring-like magnets (11A and 11B) are magnetized so that the directions of magnetic fluxes face slantingly with one another.

15 Claims, 30 Drawing Sheets

SURFACE MAGNETIC FLUX DENSITY
DISTRIBUTION OF THE FACE E

SUPERCONDUCTING BEARING

TECHNICAL FIELD

This invention relates to a superconducting bearing using a superconductor, which is used for, for example, a fluid machine or machine tool which needs a high speed rotation, and a power storage device which reserves an excess power by converting it into the kinetic energy of a fly wheel.

BACKGROUND ART

Lately, a superconductor has been used to develop a superconducting bearing which allows a high speed rotation by axially supporting a rotor (rotation axis) in a non-contact state. As shown in FIG. 38, a superconducting bearing first consists of one ring-like permanent magnet 32 which is coaxially disposed on a rotor (rotation axis) 31 having the axis perpendicularly arranged and has both ends along the axial direction of the rotor 31 mutually magnetized in opposite polarities, and a ring-like superconductor 33 disposed to oppose the opposite face of the permanent magnet 32 with a gap therebetween in the direction of the rotating axis (For example, Japanese Patent Application No. 51430/1991). In FIG. 38, 34 represents a circular plate attached to the rotor 31, 35 a permanent magnet comprising the ring-like permanent magnet 32 and the circular plate 34, 36 a circular plate support to which the superconductor 33 is fixed, 37 a superconductor member comprising the superconductor 33 and the circular plate support 36, 38 a cooling case, 39 a temperature control unit, and 40 a refrigerator.

A conventional superconducting bearing is then proposed, to enhance a load capacity and stiffness, to dispose for example two ring magnets 32A, 32B to adjoin each other to increase the surface area of magnets as shown in FIG. 39. And, to further improve a loading force, two ring magnets 32A, 32B are reversely magnetized from the axial direction as shown in FIG. 40. In FIG. 39 and FIG. 40, setting is made to be a=b=30 mm.

However, according to the prior art of the above publication, an integral ring-like permanent magnet which can be used for a small bearing has a drawback of being difficult to be used for a larger bearing in view of the production and magnetization.

Specifically, to form a large-sized bearing, it is necessary to produce an integral ring-like permanent magnet having a large diameter. Generally, a powerful magnet having a large energy product includes rare earth magnets, and an Nd-Fe-B magnet is known as the most powerful rare earth magnet at present. But, since this magnet is produced by a sintering method, a larger making machine and higher pressure are required as its size becomes larger, and the production is limited to an integral ring-like permanent magnet having a diameter of about 100 mm at present. A Pr magnet (Pr-Fe-B-Cu) which is produced by a hot rolling method can be produced into an integral ring-like permanent magnet having a diameter of 100 mm or more. But, even if a ring-like permanent magnet having a large diameter is produced, it is difficult to attach to a circular plate because magnetic force is high. Further, to attach a ring-like permanent magnet having a large diameter, a size becomes excessively large including a magnetized yoke, and it is quite dangerous because of internal breakage of the magnet and breakage of the magnetized yoke due to mechanical energy generated when magnetizing. Besides, it is dangerous to transfer the magnet.

Therefore, the ring-like permanent magnet 32 having a large diameter may be formed by joining a plurality of magnets 41, 41, . . . in the circumferential direction (a direction along the circumference) to form a ring as shown in FIG. 41. But, this ring-like permanent magnet 32 has the nonuniformity of magnetic flux in the revolving direction deteriorated at the joint parts of the magnets 41, 41, . . . causing uneven magnetic flux and a drawback of increasing a loss of revolving energy of the bearing as shown in FIG. 42. And, in case of a ring-like permanent magnet integrally formed in the shape of a ring, there is the same drawback as above in the production because of the presence of uneven magnetic flux.

And, as shown in FIG. 39, when a plurality of ring-like permanent magnets 32A, 32B is coaxially disposed to adjoin each other to enhance magnetic flux density and to obtain high magnetic field intensity, since the directions of magnetic fluxes in individual ring-like permanent magnets 32A, 32B are parallel as shown by arrows in FIG. 39, characteristics of magnetic flux density at a point 2 mm away from the exposed magnet surface are flat at the section W which is a width of both magnets 32A, 32B as shown in FIG. 43, and the absolute quantity of magnetic flux density is only 5 kG (gauss) at a maximum, and magnetic field intensity is limited. The magnetic field intensity of the magnet influences a loading force of the superconducting bearing, and when it is high, a loading force is increased and a heavy fly wheel can be supported, and a load capacity can be increased.

Consequently, this invention aims to provide a superconducting bearing which can improve the uniformity of surface magnetic field density in the circumferential direction by decreasing uneven magnetic flux in the circumferential direction (revolving direction) with a ring-like magnet, can increase magnetic field intensity by the ring magnet, resulting in increasing a loading force so as to be applicable to a high-speed revolution, and can be structured into a large system.

SUMMARY OF THE INVENTION

To accomplish the above objects, the superconducting bearing according to one aspect of the invention comprises a rotating member and a fixed member, one of which is provided with a superconducting member while the other is provided with a magnet, the superconducting member including a superconductor for floating the magnet and a support for supporting the superconductor, the magnet including a ring-like magnet which is coaxial with the axis of the rotary member, and the ring-like magnet and the superconductor member being so disposed as to face each other with a gap between them, characterized by disposing a magnetic flux diffusion member on the surface of the ring-like magnet opposed to the superconductor.

The superconducting bearing according to another aspect of the invention has the ring-like magnet and the superconductor disposed to face each other in the axial direction of the rotor.

The superconducting bearing according to still another object of the invention has the ring-like magnet and the superconductor disposed to face each other in the radial direction of the rotor.

The superconducting bearing according to yet another aspect of the invention has the ring-like magnet structured by adjoining a plurality of permanent magnets in the circumferential direction.

The superconducting bearing according to another aspect of the invention comprises a rotating member and a fixed member, one of which is provided with a superconducting member while the other is provided with a magnet, the superconducting member including a superconductor for floating the magnet and a support for supporting the superconductor, the magnet including a ring-like magnet which is coaxial with the axis of the rotary member, and the ring-like magnet and the superconductor member being so disposed as to face each other with a gap between them, characterized by forming the ring-like magnet by adjoining two ring-like magnets having different diameters, and magnetizing this pair of ring-like magnets to face the directions of magnetic fluxes slantingly with one another:

The superconducting bearing according to still another aspect of the invention comprises a rotating member and a fixed member, one of which is provided with a superconducting member while the other is provided with a magnet, the superconducting member including a superconductor for floating the magnet and a support for supporting the superconductor, the magnet including a ring-like magnet which is coaxial with the axis of the rotary member, and the ring-like magnet and the superconductor member being so disposed as to face each other with a gap between them, characterized by forming the ring-like magnet by adjoining two ring-like magnets having different diameters, each ring-like magnet consisting of a plurality of magnets joined in the circumferential direction, magnetizing this pair of two ring-like magnets to face the directions of magnetic fluxes slantingly with one another, and disposing a magnetic flux diffusion member on the surface of the pair of ring-like magnets opposed to the superconductor.

The superconducting bearing according to yet another aspect of the invention comprises a rotating member and a fixed member, one of which is provided with a superconducting member while the other is provided with a magnet, the superconducting member including a superconductor for floating the magnet and a support for supporting the superconductor, the magnet including a ring-like magnet which is coaxial with the axis of the rotary member, and the ring-like magnet and the superconductor member being so disposed as to face each other with a gap between them, characterized by disposing a magnetic flux diffusion member on the surface of the ring-like magnet opposed to the superconductor, and disposing a non-magnetic layer between the ring-like magnet and the magnetic flux diffusion member.

The superconducting bearing according to another aspect of the invention comprises a rotating member and a fixed member, one of which is provided with a superconducting member while the other is provided with a magnet, the superconducting member including a superconductor for floating the magnet and a support for supporting the superconductor, the magnet including a ring-like magnet which is coaxial with the axis of the rotary member, and the ring-like magnet and the superconductor member being so disposed as to face each other with a gap between them, characterized by disposing a magnetic flux diffusion member on the surface of the ring-like magnet opposed to the superconductor, this magnetic flux diffusion member being provided with magnetic anisotropy.

The superconducting bearing according to still another aspect of the invention disposes a magnetic resistance layer, which increases magnetic resistance in the radial direction, within the magnetic flux diffusion member so as to provide the magnetic flux diffusion member with magnetic anisotropy.

The superconducting bearing according to yet another aspect of the invention comprises a rotating member and a fixed member, one of which is provided with a superconducting member while the other is provided with a magnet, the superconducting member including a superconductor for floating the magnet and a support for supporting the superconductor, the magnet including a ring-like magnet which is coaxial with the axis of the rotary member, and the ring-like magnet and the superconductor member being so disposed as to face each other with a gap between them, characterized by making the width in the radial direction of the surface of the ring-like magnet opposing to the superconducting member to be substantially equal to the width in the radial direction of the surface of the superconducting member opposing to the ring-like magnet, and making the width in the radial direction of the back face of the ring-like magnet to be greater than the width in the radial direction of the surface of the ring-like magnet.

The superconducting bearing according to another aspect of the invention has a groove disposed along the circumferential direction on a side opposing to the superconducting member of the ring-like magnet.

The superconducting bearing according to still another aspect of the invention has a plate which is made of a magnetic material disposed on the surface of the ring-like magnet.

The superconducting bearing according to yet another aspect of the invention comprises a rotating member and a fixed member, one of which is provided with a superconducting member while the other is provided with a magnet, the superconducting member including a superconductor for floating the magnet and a support for supporting the superconductor, the magnet including a ring-like magnet which is coaxial with the axis of the rotary member, and the ring-like magnet and the superconductor member being so disposed as to face each other with a gap between them, characterized by disposing at least two ring-like magnets, which have different diameters and are magnetized to face the same poles in the radial direction, as the ring-like magnet, and disposing an air layer or solid member between the adjacent ring-like magnets.

The superconducting bearing according to another aspect of the invention has a magnetic ring made of a magnetic material disposed between the adjacent ring-like magnets.

BEST MODE FOR CARRYING OUT THE INVENTION

A first embodiment of this invention will be described with reference to the drawings.

Figure 1:
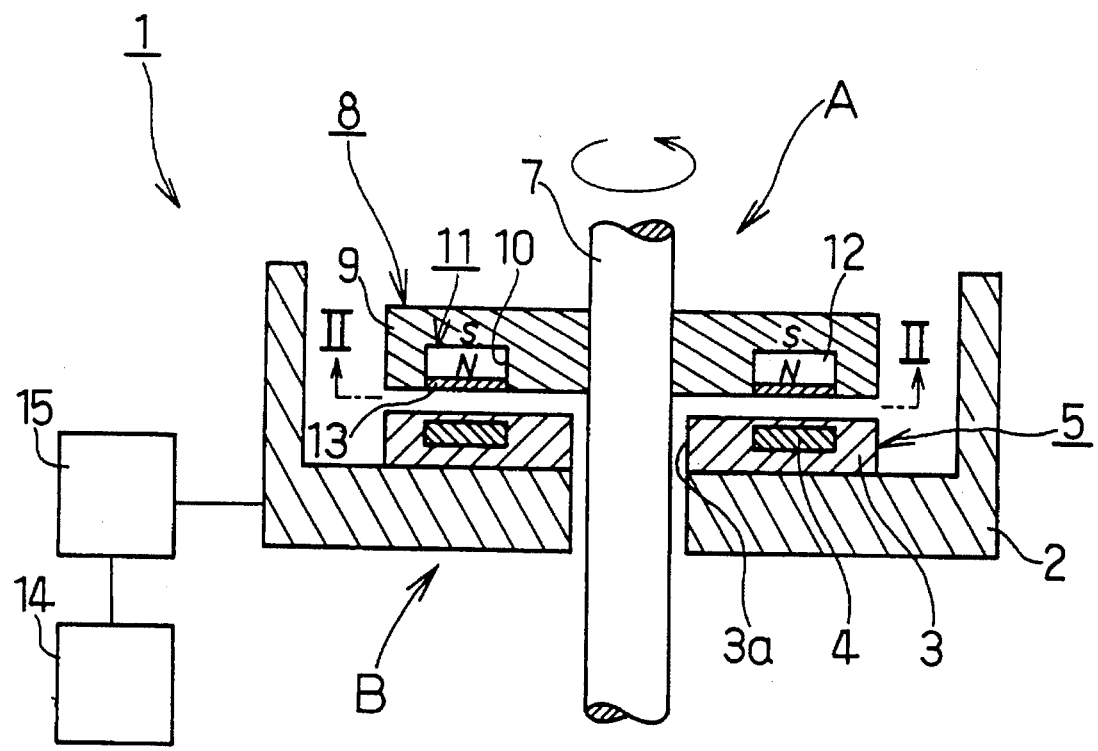
FIG. 1 is a sectional view taken along line I—I of FIG. 2 showing the superconducting bearing according to a first embodiment of this invention.

FIG. 1 is a vertical sectional view showing the essential part of a superconducting bearing 1, which is disposed in a housing not shown. Specifically, in the housing, a cooling case 2 is fixed to the housing, a disk-like support 3 is horizontally fixed on the cooling case 2, and a through hole 3a is formed at the center of the support 3 through the support 3 and the cooling case 2. The above support 3 is formed in the shape of a disk by copper. And, in the support 3, a plurality of disk-like superconductors 4 is embedded to form a ring with the through hole 3a at the center. And, a superconductor member 5 consists of the support 3 and the superconductors 4. In this embodiment, superconductor member 5 is disposed on a fixed member B, and a magnet to be described afterward is disposed on a rotating member A.

The above superconductor 4 is made of a yttrium based high-temperature superconductor, e.g., a substrate of $YBa_2Cu_3 Ox$ within which normal conducting particle $Y_2Ba_1Cu_1$ is uniformly mixed, and has a characteristic to restrict the magnetic fluxes generated from a ring-like permanent magnet (ring-like magnet) 11 to be described afterward from penetrating. The superconductor 4 has its width set to be almost equal to the width (distance along the radial direction of a rotor 7) of the ring-like permanent magnet 11. Further, the superconductors 4 are disposed to face the ring-like permanent magnet 11 to be described afterward and separated at a position where the distribution of the penetrated magnetic fluxes is not changed by the revolution of the rotor 7 to be described afterward at a position where a certain quantity of magnetic fluxes from the ring-like permanent magnet 11 penetrates.

And, in the housing, the rotor (rotation axis in the embodiment) 7 is disposed in the vertical direction, its lower end is passed through the above through hole 3a, and a magnet (permanent magnet in the embodiment) 8 is disposed at the upper part. This magnet 8 is fixed to the rotor 7 to form a rotor member A.

The magnet 8 comprises a circular plate 9 in the shape of a flat disk, the ring-like permanent magnet 11, and a shim (plate) 13 in this embodiment. The circular plate 9 is made of, for example, copper, and attached horizontally to and integrally rotatably with the rotor 7 to oppose the disk-like support 3. In the lower face of the circular plate 9, a ring-like groove 10 is coaxially formed with the axis of the rotor 7, and the ring-like permanent magnet 11 is disposed and fixed in the groove 10.

Figure 2:
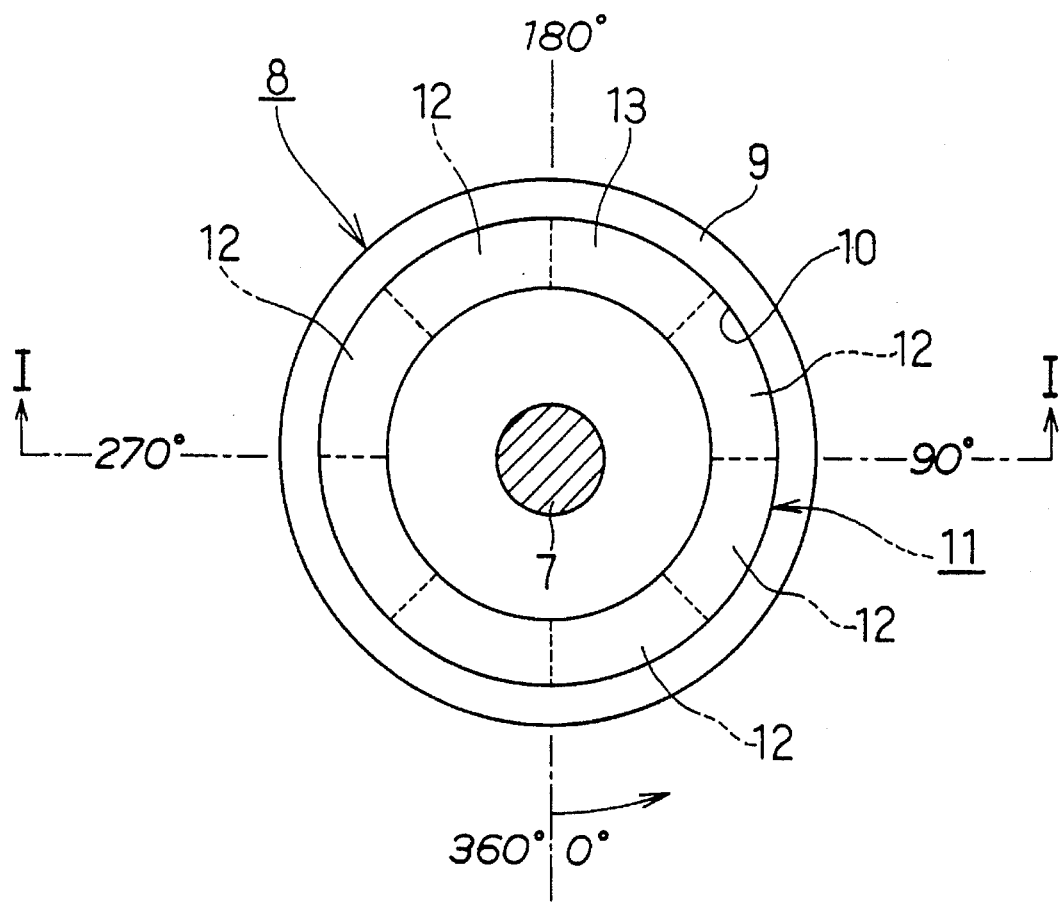
FIG. 2 is a view taken along line II—II of FIG. 1, showing the bottom face of the permanent magnet, according to a first embodiment of this invention.
Figure 3:
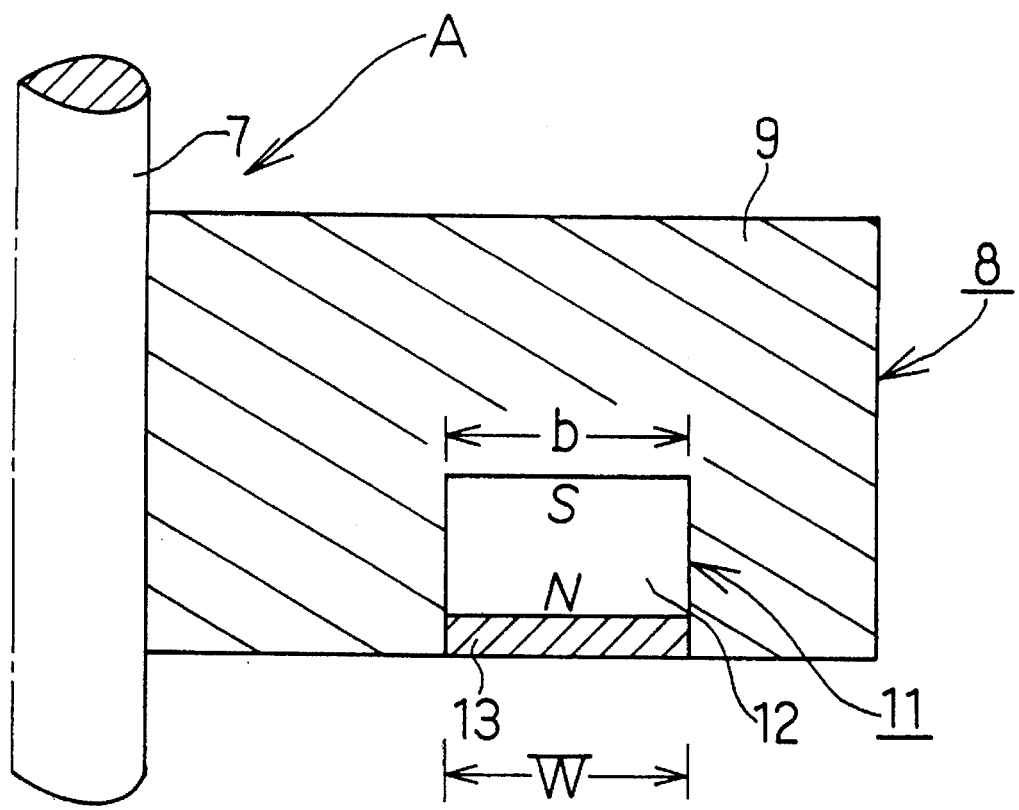
FIG. 3 is a vertical sectional view showing the essential part of the permanent magnet according to a first embodiment of this invention.
Figure 4:
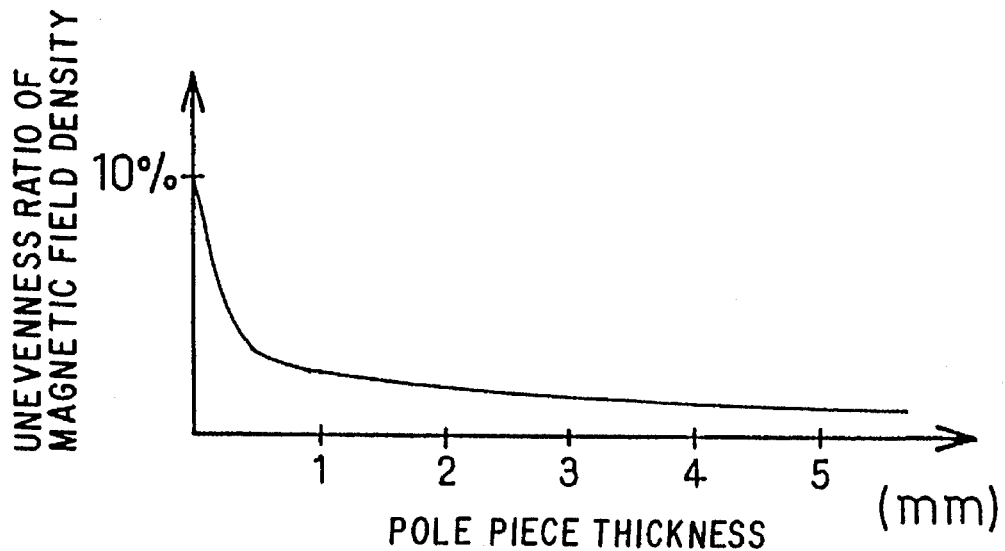
FIG. 4 is characteristics showing the relation between the thickness of shim 13 and the unevenness ratio of magnetic field density according to a first embodiment of this invention.
Figure 5:
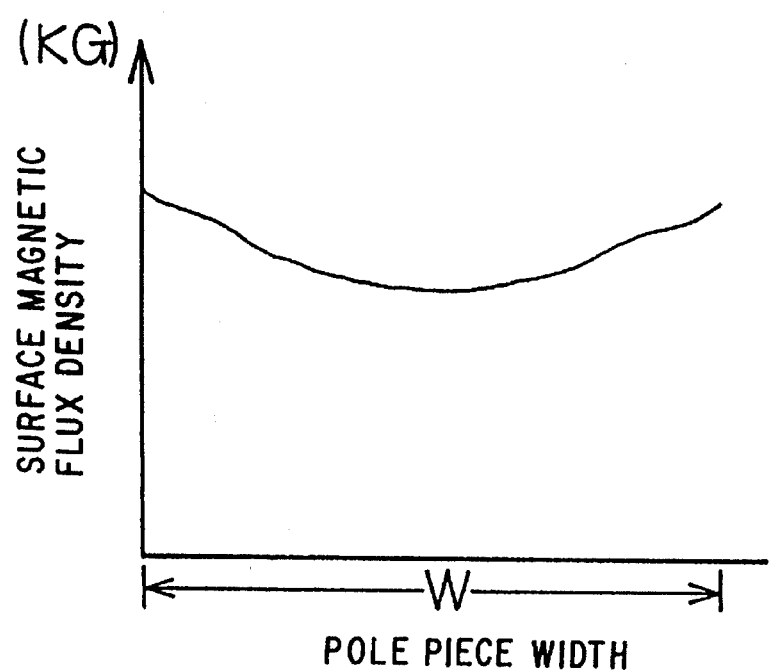
FIG. 5 is characteristics showing the relation between the width of shim 13 and the surface magnetic flux density according to a first embodiment of this invention.

Further, the above ring-like permanent magnet 11 is structured by successively joining a plurality (8 pieces in this embodiment) of magnets 12, 12, . . . in the circumferential direction (a direction along the circumference), and individual magnets 12, 12, . . . are made of a Pr magnet in this embodiment. And, on the opposing face (lower face in the figure) of the ring-like permanent magnet 11 facing the superconductor member 5, the shim 13 which is formed into a ring from a thin plate is fitted and fixed in the groove 10 to cover the opposing face as shown in FIG. 2 and FIG. 3. This shim 13 is a magnetic flux diffusion material and made of soft iron in this embodiment and has a function to diffuse magnetic fluxes so that the magnetic fluxes from the ring-like permanent magnet 11 become uniform. And the thickness of the shim 13 is about 0.5 mm when width b is 20 to 30 mm with reference to characteristics when a breadth size b in the radial direction of the ring-like permanent magnet 11 shown in FIG. 4 is 30 mm for example. And, width W of the shim 13 is set to be at least equal to or more than width b of the ring-like permanent magnet 11. FIG. 5 shows the characteristics of magnetic flux density on the surface of the shim 13 when the width W is set to be equal to the width b. In FIG. 1, 14 represents a refrigerator for cooling the cooling case 2 in the housing, and 15 a temperature control unit for controlling a temperature of the refrigerator 14.

With this superconducting bearing 1, the superconductor 4 is cooled by a circulating refrigerant in the cooling case 2 and kept under a superconducting state. And, under the superconducting state, the magnetic fluxes from the ring-like permanent magnet 11 of the rotor 7 penetrate into the superconductor 4, and within the superconductor 4, the penetrated magnetic flux distribution within the superconductor 4 becomes constant by the normal conducting particles uniformly mixed, and as if the ring-like permanent magnet 11 of the rotor 7 is pierced by a virtual pin protruded on the superconductor 4, the ring-like permanent magnet 11 is floated and rotated with the rotor 7 restricted (pinning phenomenon) by the superconductor 4 together with the ring-like permanent magnet 11.

Figure 6:
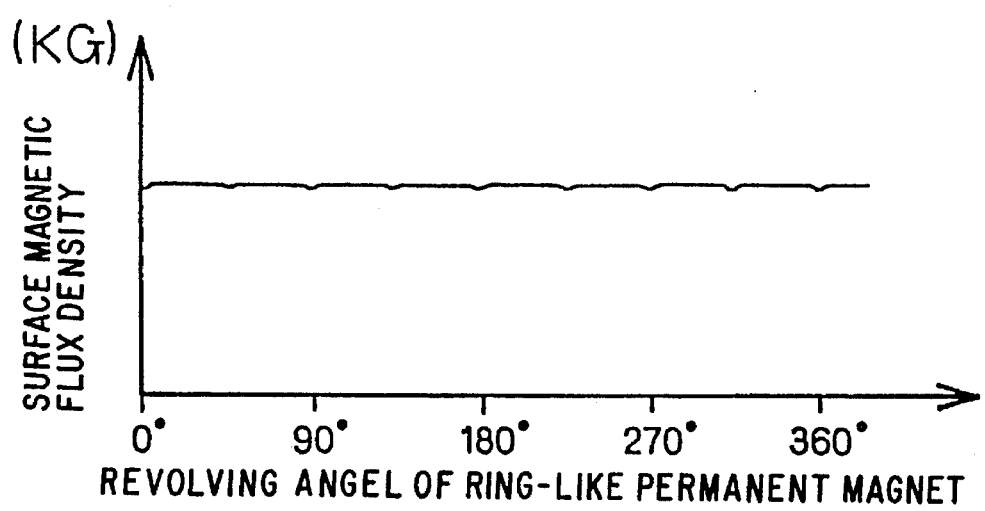
FIG. 6 is a diagram showing the relation between the revolving angle and the surface magnetic flux density according to a first embodiment of this invention.

In this case, the ring-like permanent magnet 11 is formed by joining the plurality of magnets 12, 12, . . . , but since the shim 13 made of soft iron is disposed on a side to oppose the superconducting member 5 of the ring-like permanent magnet 11, a large nonuniformity of magnetic fluxes generated at the joint parts of the magnets 12, 12, depression of the magnetic flux density is relieved extensively. In other words, with the shim 13 made of soft iron, since magnetic permeability is high and does not have directionality, magnetic fluxes in the shim 13 are appropriately dispersed within the surface, so that as shown in FIG. 6, a change of magnetic flux density at the joint parts in the revolving direction can be decreased to a large extent, and as a result, a loss of revolving energy of the rotor can be decreased. This is also suitable to decrease the uneven magnetic flux in the circumferential direction in case of a one-piece ring-like permanent magnet 11 because the uneven magnetic flux is generated in the production not only when the ring-like permanent magnet 11 is structured by jointing a plurality of magnets 12, 12, . . . but also when the ring-like permanent magnet 11 is integrally formed.

High uniformity of magnetic flux density can be obtained as the thickness of the shim 13 increases, but when the thickness is large, a distance between the magnet face of the ring-like permanent magnet and the superconductor is excessively separated, and magnetic field intensity becomes small. Therefore, the thickness of the shim 13 is preferably 0.5 mm or more when a required level of uniformity is determined to be, for example, within +/−100G.

To influence the force of the bearing, in addition to the magnitude of the absolute value of the magnetic flux density of the magnets of the permanent magnet, it is necessary to give a gradient to the magnetic flux density, but when the shim 13 is disposed, a large gradient of magnetic flux is obtained in the radial direction of the ring-like permanent magnet as shown in FIG. 5. This is caused because the magnetic flux has characteristics to deviate toward the radial direction within the shim 13 of soft iron, thereby rigidity of the bearing can be further improved.

Figure 7:
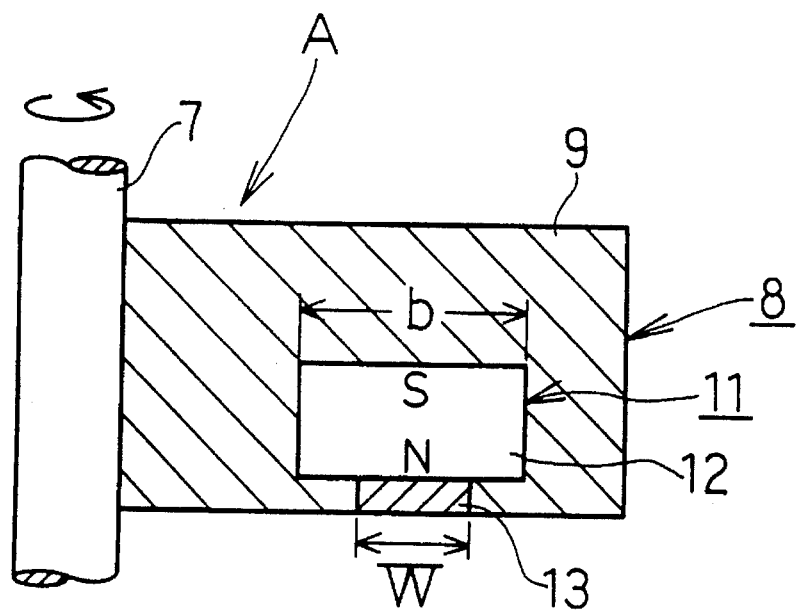
FIG. 7 is a vertical sectional view of the permanent magnet showing the shim according to a first embodiment of this invention.
Figure 8:
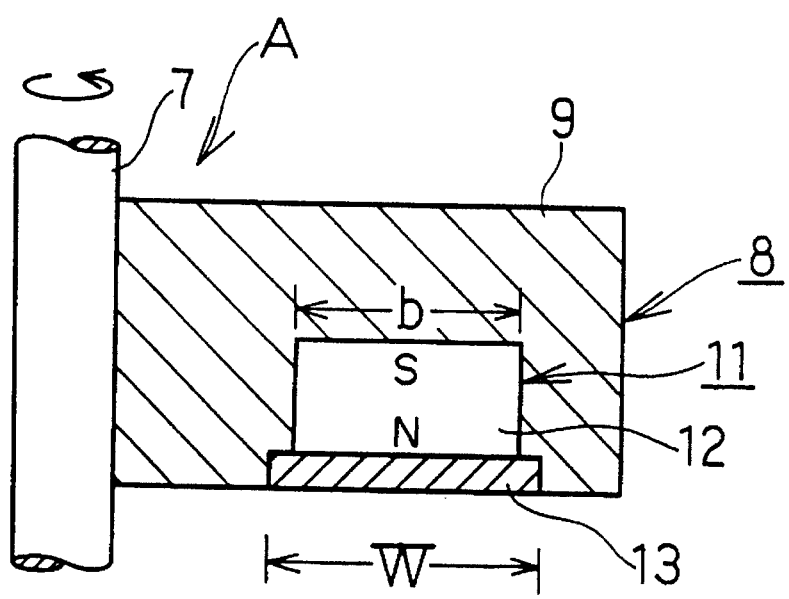
FIG. 8 is a vertical sectional view of the permanent magnet showing the shim according to a first embodiment of this invention.

And, the width W in the radial direction of the shim 13 is set to be at least equal to or more than the width b of the ring-like permanent magnet 11 in the above embodiment. But, the width W of the shim 13 may be set to be smaller than the width b of the ring-like permanent magnet 11 (W<b) as shown in FIG. 7, and the width W of the shim 13 may be set to be larger than the width b of the ring-like permanent magnet 11 (W>b) as shown in FIG. 8. When the width D of the shim 13 shown in FIG. 7 is smaller than the width b of the permanent magnet 11 (W<b), uniformity of magnetic fluxes at the magnet with the shim 13 is decreased, while uniformity in the circumferential direction of magnetic fluxes at the magnet with the shim 13 is good. And, since magnetic fluxes are concentrated on the shim 13 at the magnet with shim 13, a gradient of the entire magnetic fluxes in the radial direction is increased, so that a loading force is improved. On the contrary, when the width W of the shim is increased (W>b) as shown in FIG. 8, a gradient in the radial direction of magnetic fluxes is slightly lowered, but uniformity in the circumferential direction of magnetic fluxes at the magnet is secured, there is not a problem in particular in view of performance.

As described above, even when the ring-like magnet is formed integrally or formed by disposing a plurality of magnets in the shape of a ring, the uneven magnetic flux in the circumferential direction can be fully remedied, and a gradient of magnetic fluxes can be obtained in the radial direction. Therefore, when the ring-like magnet is formed by disposing a plurality of magnets in the shape of a ring, the ring-like magnet can be produced as divided, a ring-like magnet having a larger diameter can be obtained, and a large bearing with a large loading force can be structured. And, the presence of the shim prevent the magnet from scattering.

Now, a second embodiment of the invention will be described. In each embodiment to be described below, the same description as in the first embodiment will be omitted, and the essential point of the structure of each embodiment will be described.

To support a heavy substance by a bearing, it is necessary to increase a loading force of the bearing. To increase the loading force, it is necessary to enhance magnetic flux density of a superconductor member and to give a gradient to the magnetic flux density along the radial direction. Therefore, to realize it, this embodiment disposes ring-like magnets 11A, 11B having different diameters to adjoin each other on the circular plate 9 as shown in FIG. 9 through FIG. 13 and FIG. 15 through FIG. 17.

Figure 9:
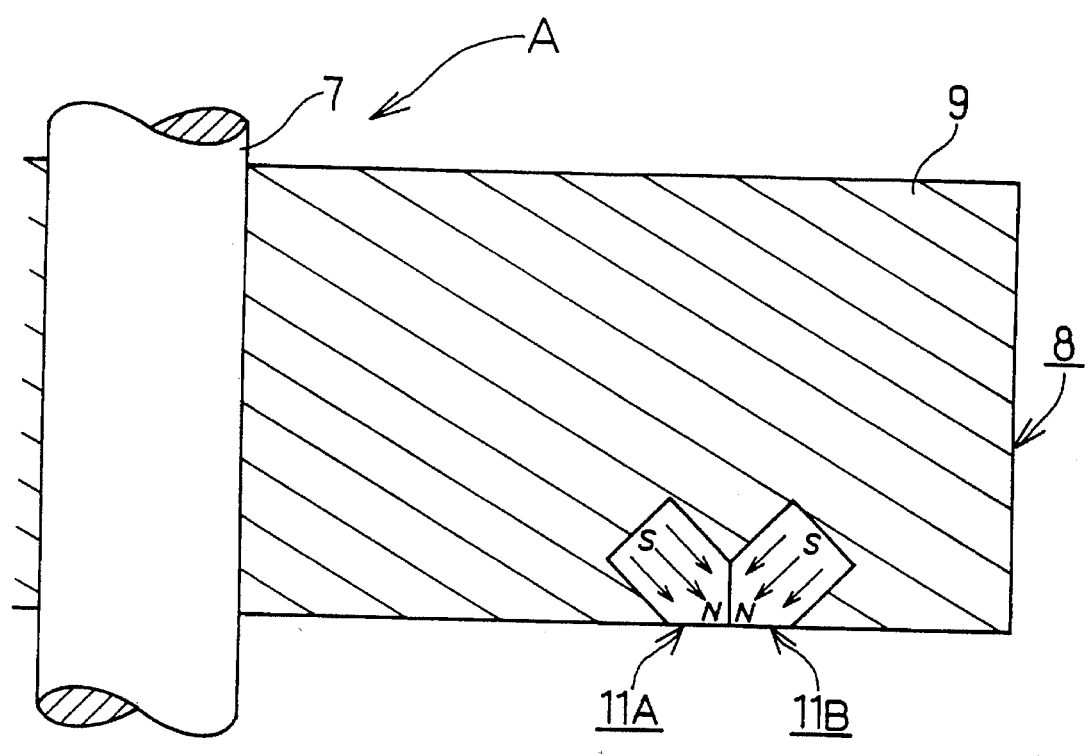
FIG. 9 is a vertical sectional view of the essential part of the permanent magnet according to a second embodiment of this invention.
Figure 10:
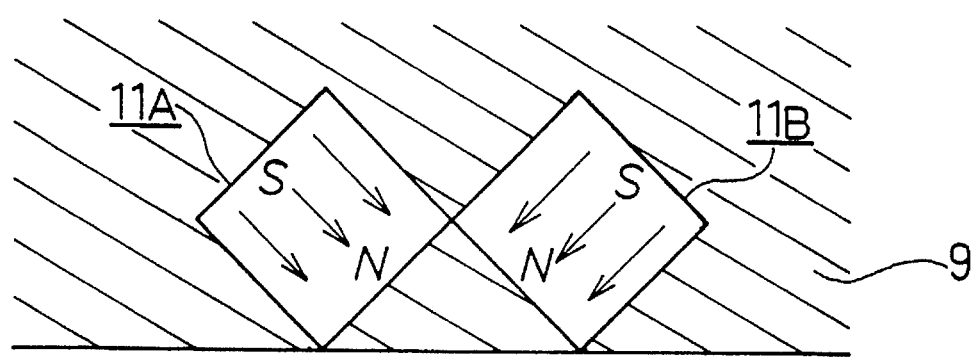
FIG. 10 is a vertical sectional view of the ring-like permanent magnet according to a second embodiment of this invention.
Figure 11:
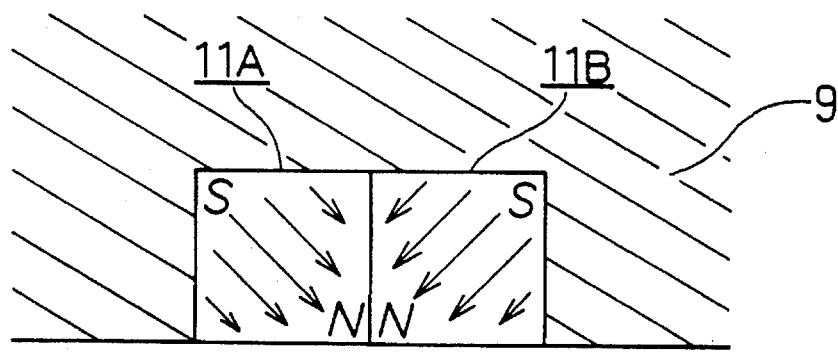
FIG. 11 is a vertical sectional view of the ring-like permanent magnet according to a second embodiment of this invention.
Figure 12:
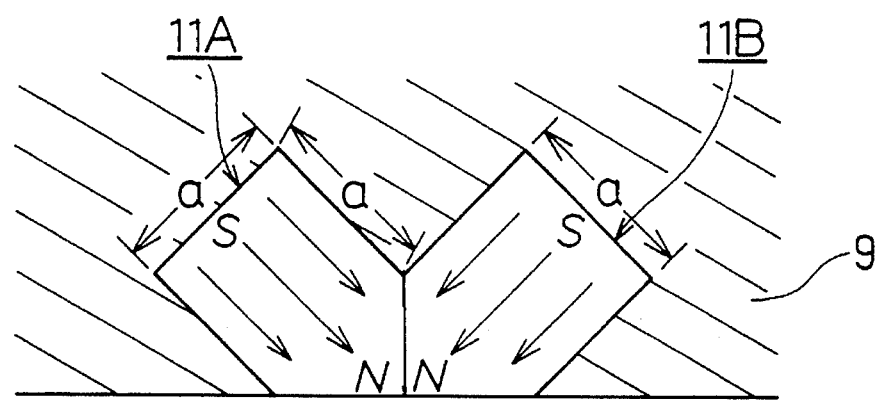
FIG. 12 is a vertical sectional view of the ring-like permanent magnet according to a second embodiment of this invention.

FIG. 9 shows a vertical sectional view of the essential part of the permanent magnet 8, and the ring-like magnets 11A, 11B are coaxially disposed in the opposed faces of the circular plate 9 to adjoin each other. And, FIG. 10, FIG. 11 and FIG. 12 show the vertical cross sectional shapes of both ring-like magnets 11A, 11B. The ring-like magnets 11A, 11B shown in FIG. 10 each have the vertical cross sectional shape formed into a lozenge, the ring-like magnets 11A, 11B shown in FIG. 11 each have the vertical cross sectional shape formed into a square and are disposed to have contacted faces, and the ring-like magnets 11A, 11B shown in FIG. 12 each have the vertical cross sectional shape formed into a pentagon and are disposed to have contacted faces. And, the magnetized direction (direction of magnetic fluxes) of both ring-like magnets 11A, 11B is disposed to face slantingly outward with the ring-like magnet 11A on the internal circumference side, and to face slantingly inward with the ring-like magnet 11B on the outer circumference side. In other words, magnetization is made to increase the magnetic flux density by slantingly bumping the directions of magnetic fluxes of the ring-like magnets 11A, 11B.

Figure 13:
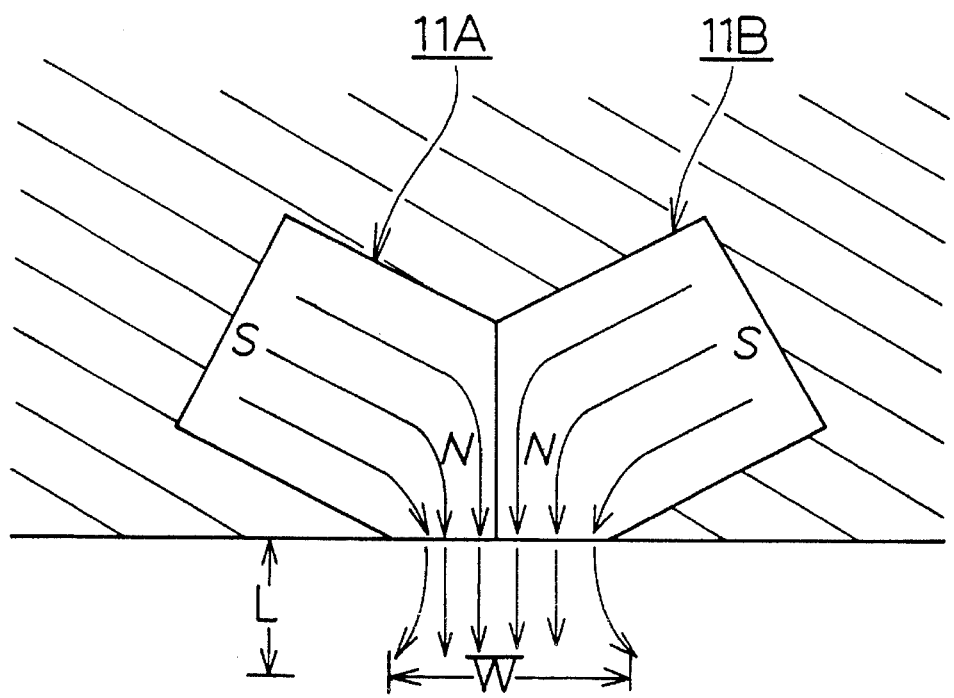
FIG. 13 is a vertical sectional view of the ring-like permanent magnet according to a second embodiment of this invention.
Figure 14:
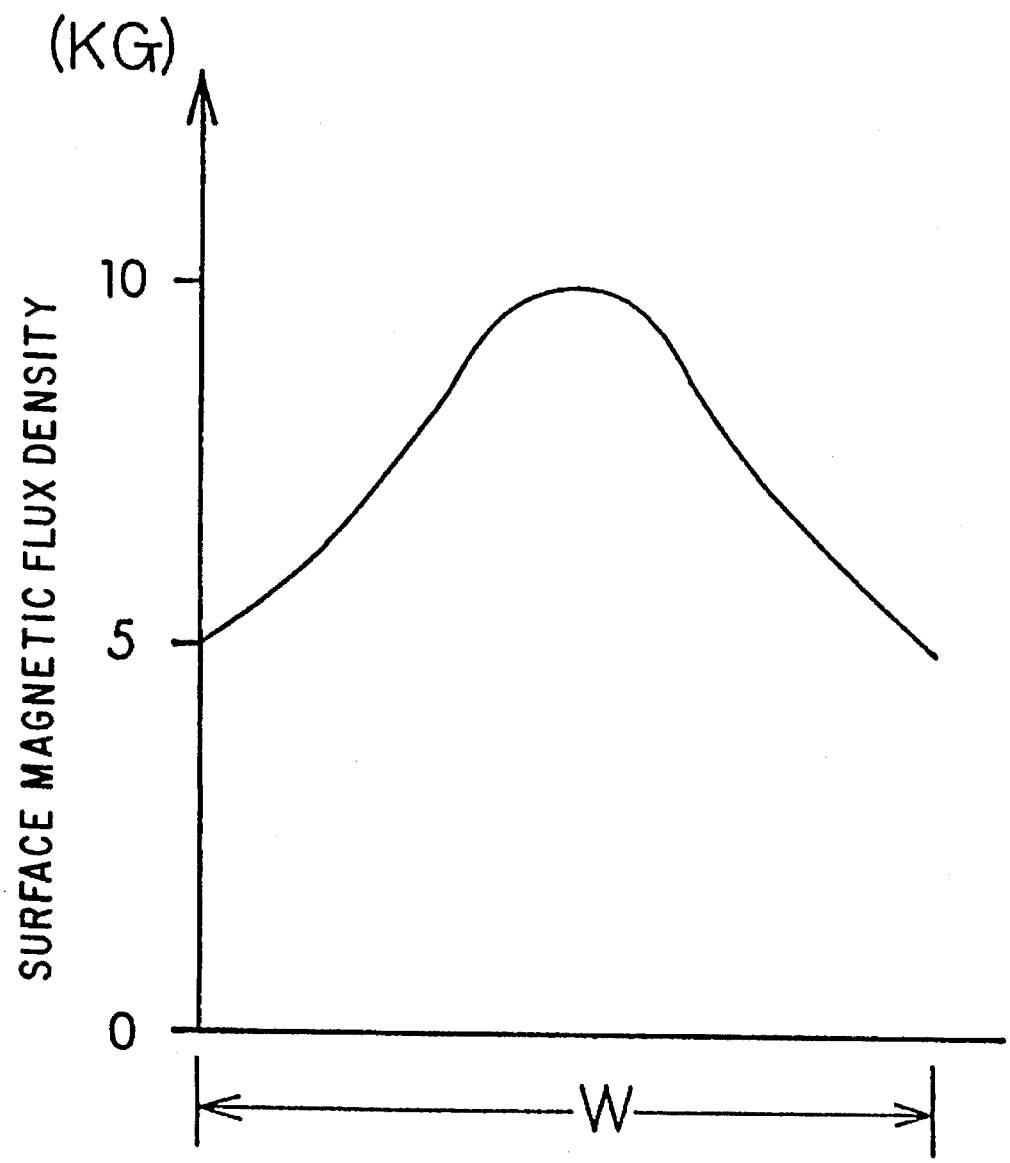
FIG. 14 is a characteristic diagram of the surface magnetic flux density of the ring-like permanent magnet according to a second embodiment of this invention.
Figure 39:
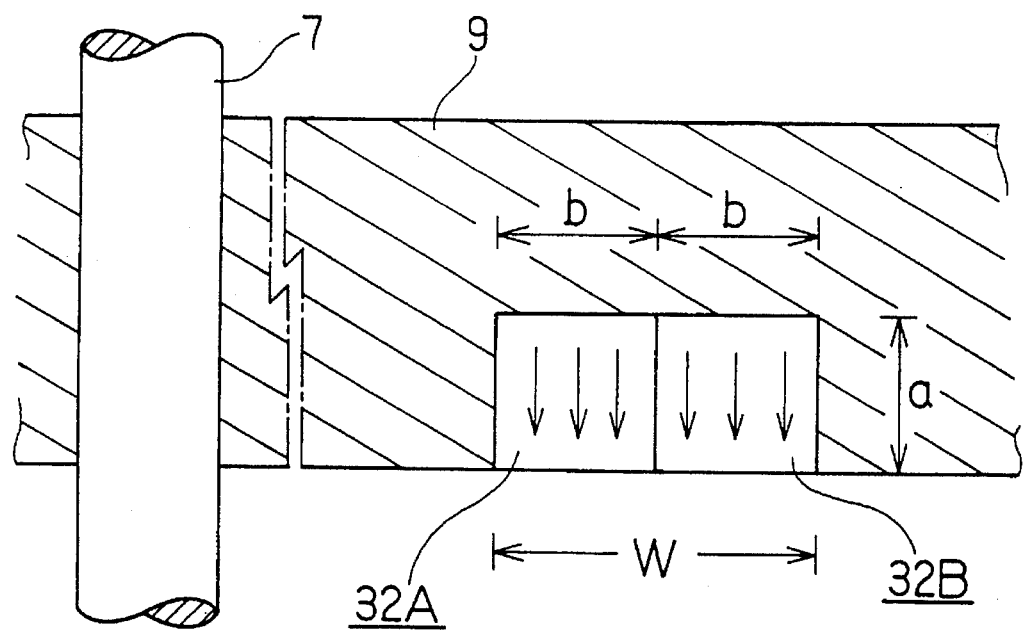
FIG. 39 is a vertical sectional view of the permanent magnet according to prior art.
Figure 40:
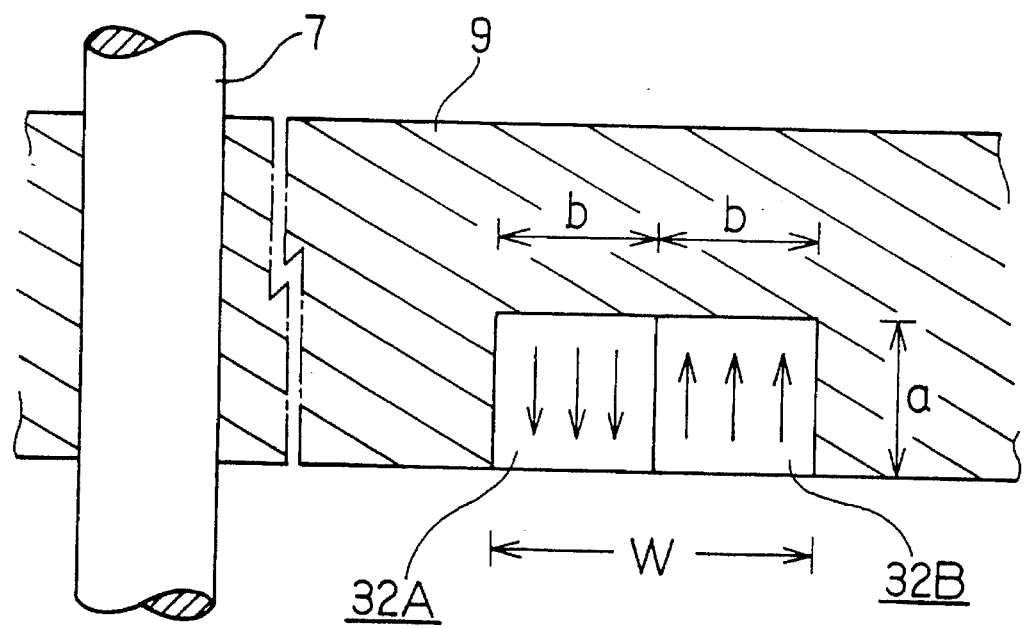
FIG. 40 is a vertical sectional view of the permanent magnet according to prior art.
Figure 41:
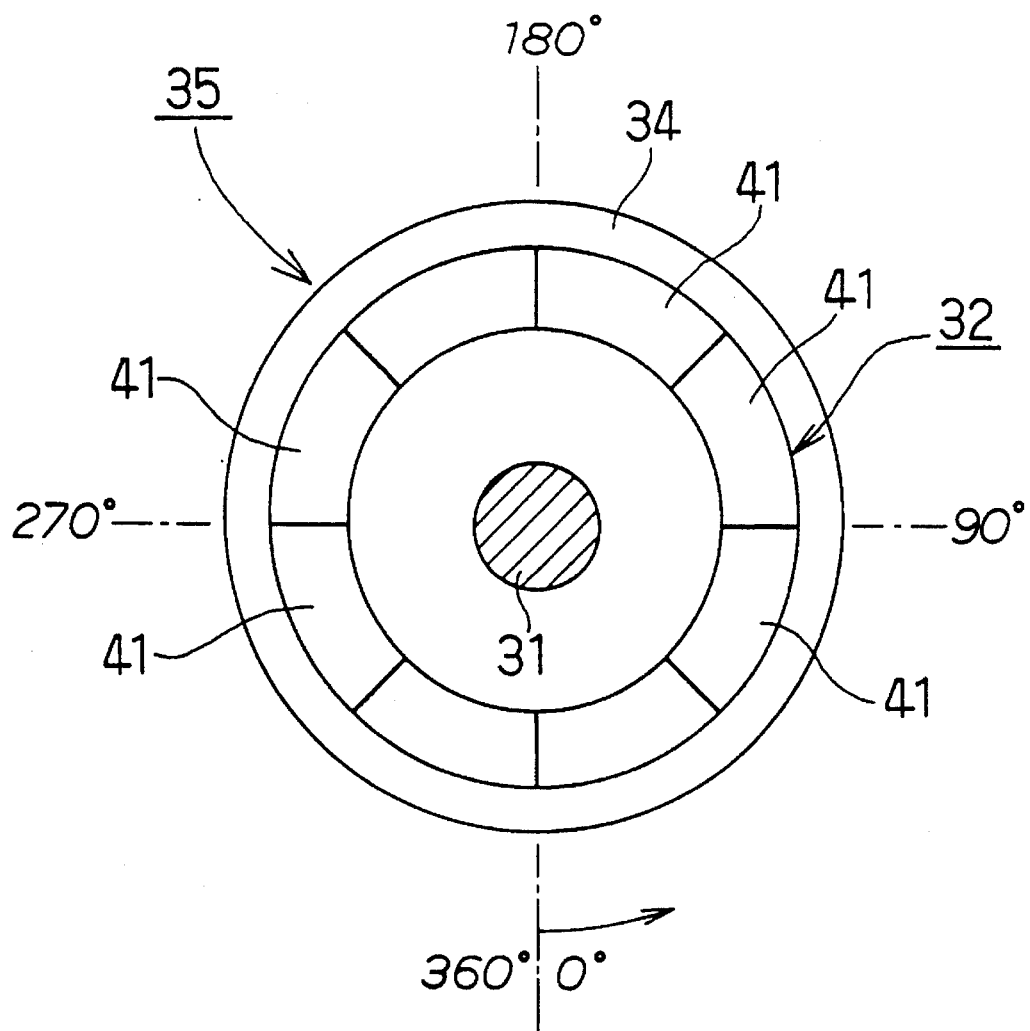
FIG. 41 is a view taken along line III—III of FIG. 38, showing the bottom face of the permanent magnet, according to prior art.
Figure 42:
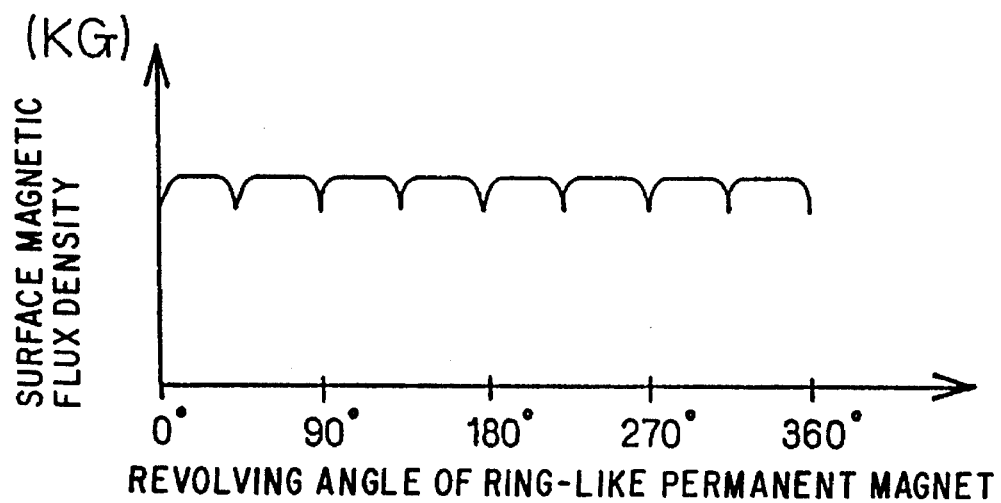
FIG. 42 is a characteristic diagram showing the relation between the revolving angle and the surface magnetic flux density according to prior art.
Figure 43:
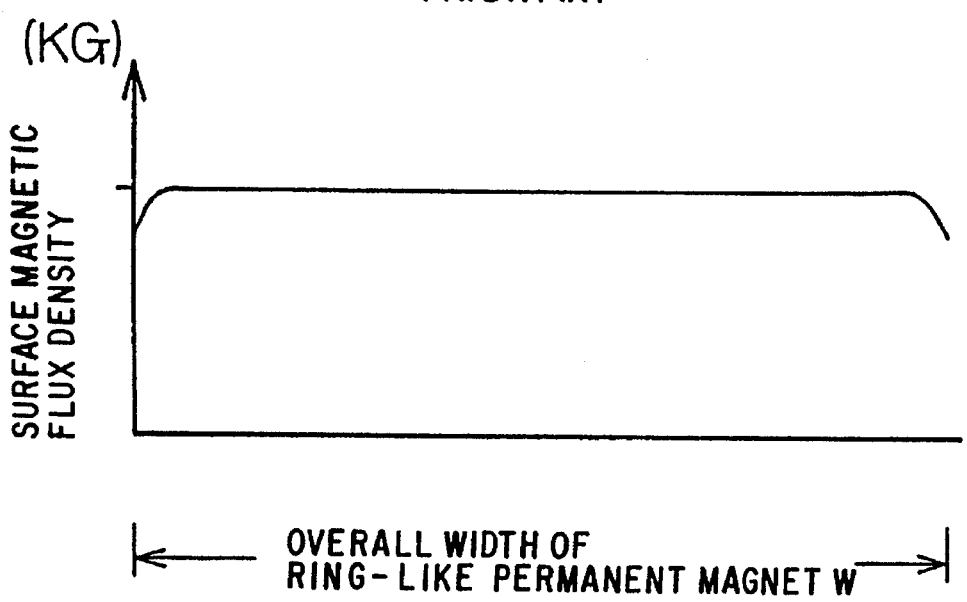
FIG. 43 is a characteristic diagram showing the surface magnetic flux density of the ring-like permanent magnet width according to prior art.

Now, the increase of magnetic flux density by a pair of ring-like magnets 11A, 11B will be described with reference to FIG. 12. Magnetic fluxes which act on the superconductor 4 from the pair of ring-like magnets 11A, 11B mutually bump slantingly as shown by the arrows in FIG. 13 as the pair of ring-like magnets 11A, 11B is magnetized in the slant direction, both magnetic fluxes repel each other to concentrate in air as shown in FIG. 13, and the magnetic flux density at a boundary surface of both ring-like magnets 11A, 11b increases sharply. As a result, as compared with a conventional case shown in FIG. 39 that magnetization is made in the direction to intersect at right angles with the superconductor 4, the magnetic flux density in the cross direction W of the exposed face of the pair of ring-like magnets 11A, 11B increases sharply as shown in FIG. 14 and a gradient of the magnetic flux density in the cross direction of the magnet or the radial direction is increased, so that a high loading force can be obtained. In this case, magnetic flux was measured at a point where L=2 mm.

Figure 15:
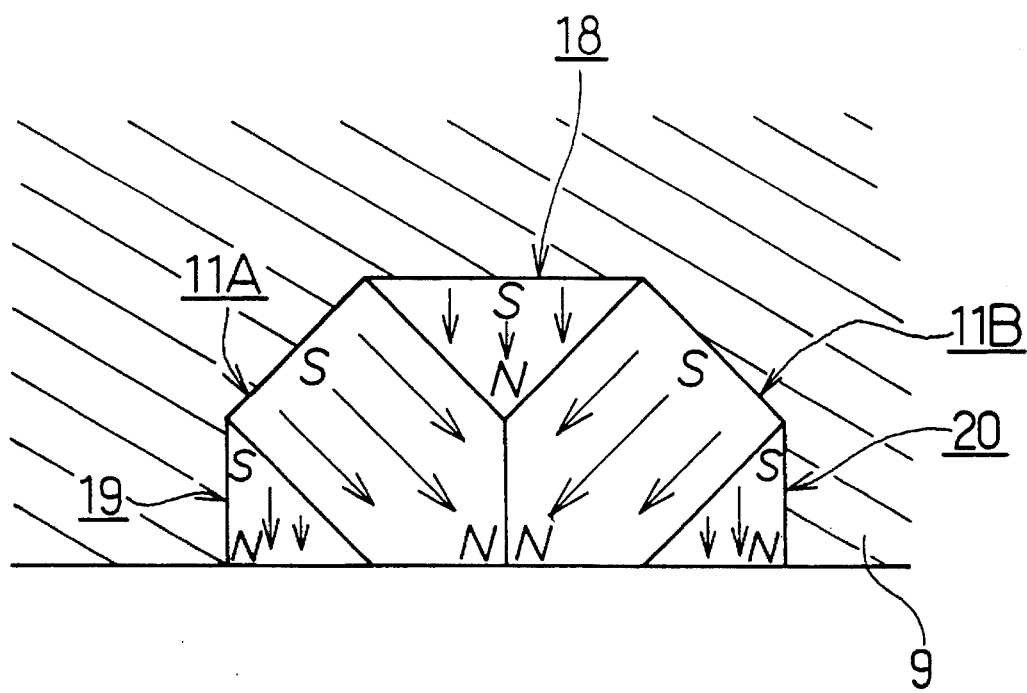
FIG. 15 is a vertical sectional view of the ring-like permanent magnet according to a second embodiment of this invention.

And, as shown in FIG. 15, when other ring-like magnets 18, 19 and 20, which are magnetized in the direction to intersect at right angles with the superconductor 4, are disposed at the rear of a boundary surface of the above pair of ring-like magnets 11A, 11B or on the internal or outer circumference side of the opposed face of the pair of ring-like magnets 11A, 11B against the superconductor 4, the diffusion of magnetic fluxes in air can be prevented, magnetic fluxes can be concentrated more effectively, and the magnetic flux density can be enhanced. The other ring-like magnets can be arranged or magnetized most efficiently for the concentration of magnetic fluxes according to the structure of a pair of ring-like magnets, and are not limited to the embodiment shown in FIG. 15.

Figure 16:
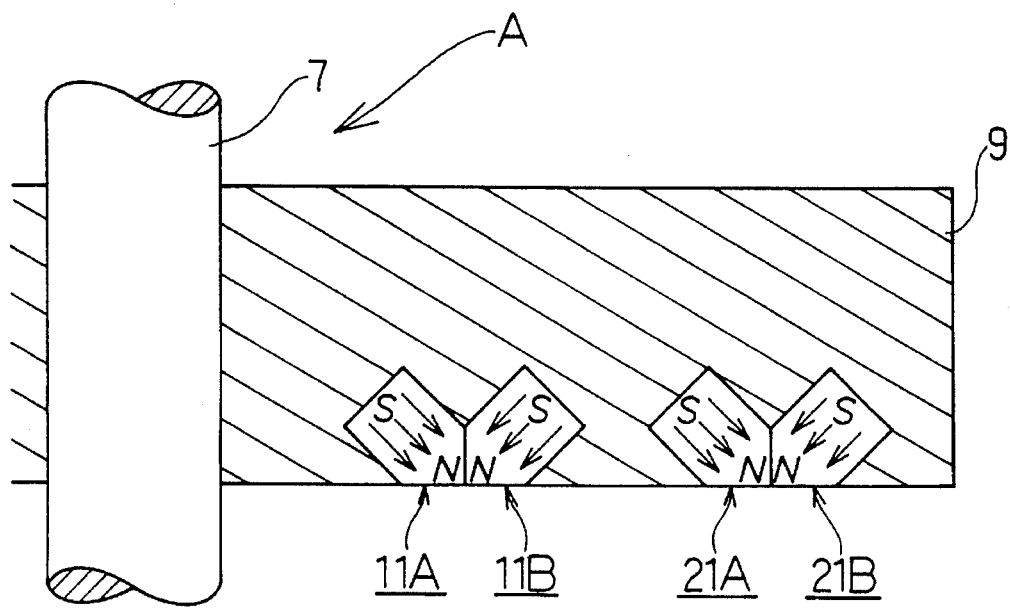
FIG. 16 is a vertical sectional view of the permanent magnet according to a second embodiment of this invention.
Figure 17:
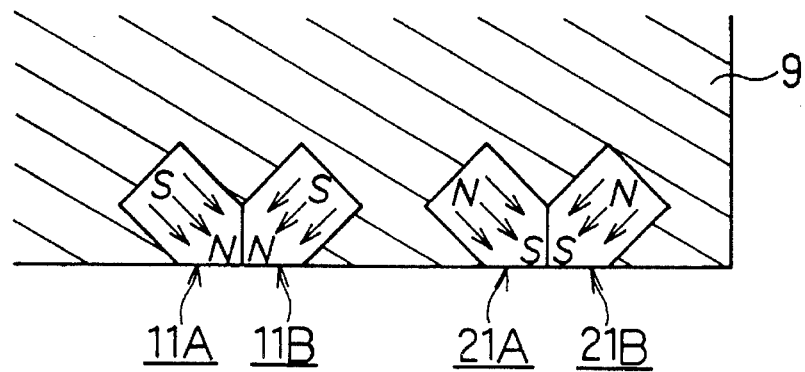
FIG. 17 is a vertical sectional view of the permanent magnet according to a second embodiment of this invention.

Further, a multiple ring-like magnet structure in which a pair of ring-like magnets is disposed in plural in the circular plate 9 to increase a loading force will be described. FIG. 16 and FIG. 17 show that a pair of ring-like magnets 11A, 11B and 21A, 21B is coaxially disposed in plural. In this case, each pair of ring-like magnets 11A, 11B and 21A, 21B is magnetized so that magnetic fluxes are slantingly faced each other, and a larger loading force is obtained because both magnetic fluxes are concentrated. In this multiple ring-like magnet structure, the magnetic poles of both exposed faces of each adjacent pair of ring-like magnets 11A, 11B and 21A, 21B may be magnetic poles in the same direction as shown in FIG. 16 or may have magnetic poles in the opposite directions as shown in FIG. 17.

The each pair of ring-like magnets shown in FIG. 9 through FIG. 13, FIG. 16 and FIG. 17 may be integrally formed. And, each ring-like magnet may be structured by joining a plurality of permanent magnets in the circumferential direction to combine in the shape of a ring as in the first embodiment. In this case, a larger loading force can be obtained and the structure is simple, so that this is preferable to form a large-size system.

Figure 18:
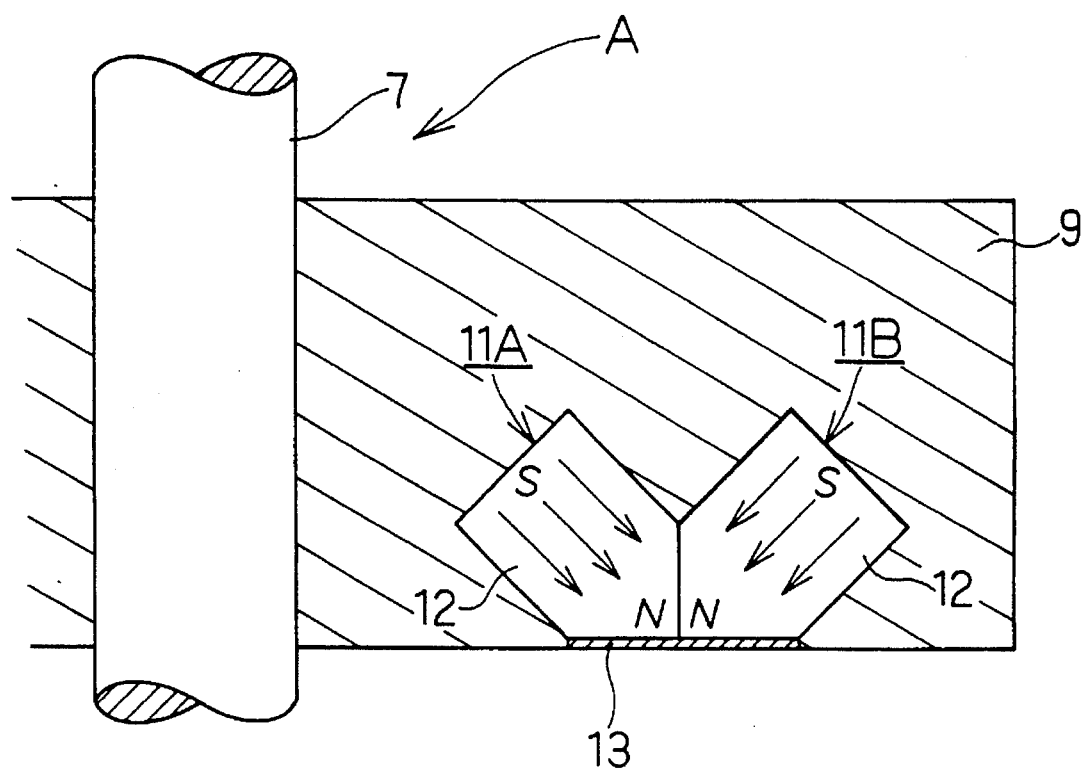
FIG. 18 is a vertical sectional view of the permanent magnet according to a third embodiment of this invention.

A third embodiment of this invention will be described with reference to FIG. 18. In this embodiment, a pair of ring-like magnets 11A, 11B is disposed so that the magnetized directions face slantingly with one another as shown in FIG. 18, these ring-like magnets 11A, 11B are formed by jointing a plurality of magnets 12 in the circumferential direction, and a shim 13, which is made of soft iron and formed into one-piece ring-like plate, is disposed on the opposing face (face opposing to the superconductor 4) which is the exposed face of both ring-like magnets 11A, 11B. This third embodiment is a combination of the first and second embodiments. As a result, a large magnetic field intensity can be obtained by the concentration of magnetic fluxes, so that a loading force can be increased, and at the same time, a large bearing having a large diameter can be structured. In particular, when each ring-like magnet is formed of a plurality of magnets, degradation of magnetic field intensity between the adjacent magnets can be decreased extensively by the shim, and the magnetic field intensity in the circumferential direction of the ring-like magnet can be made uniform, so that it is suitable for a large-size system.

And, this embodiment can be applied when ring-like magnets are coaxially disposed in plural and it is advantageous for a large-size system.

Figure 19:
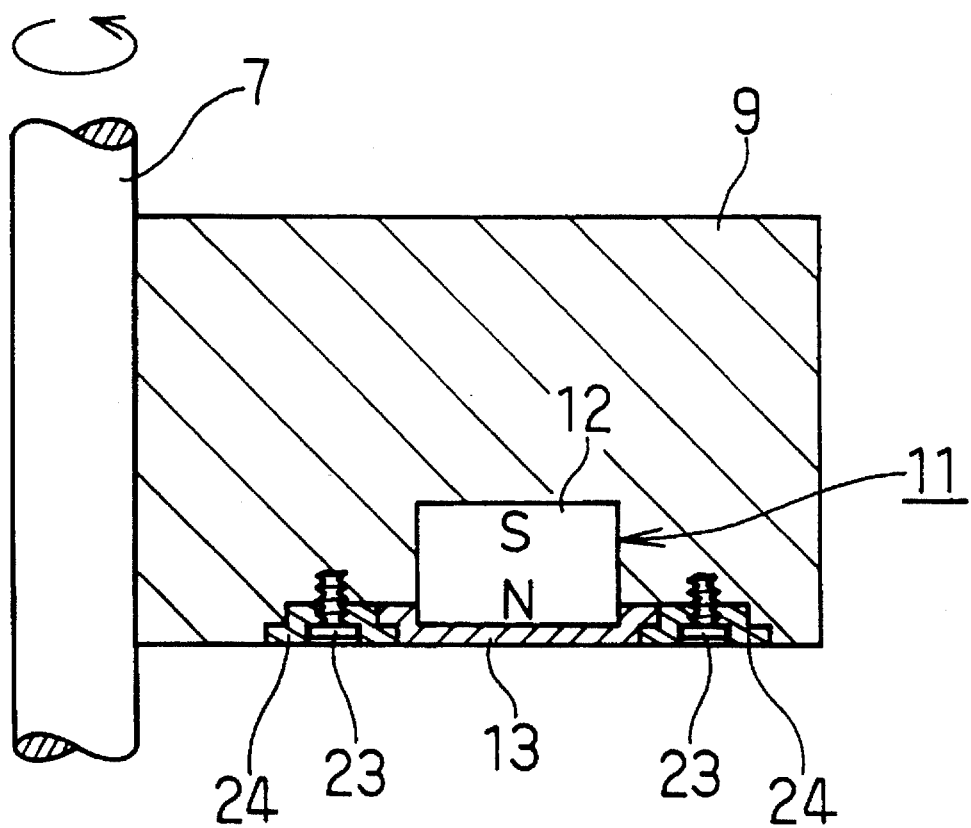
FIG. 19 is a vertical sectional view of the permanent magnet according to a fourth embodiment of this invention.
Figure 20:
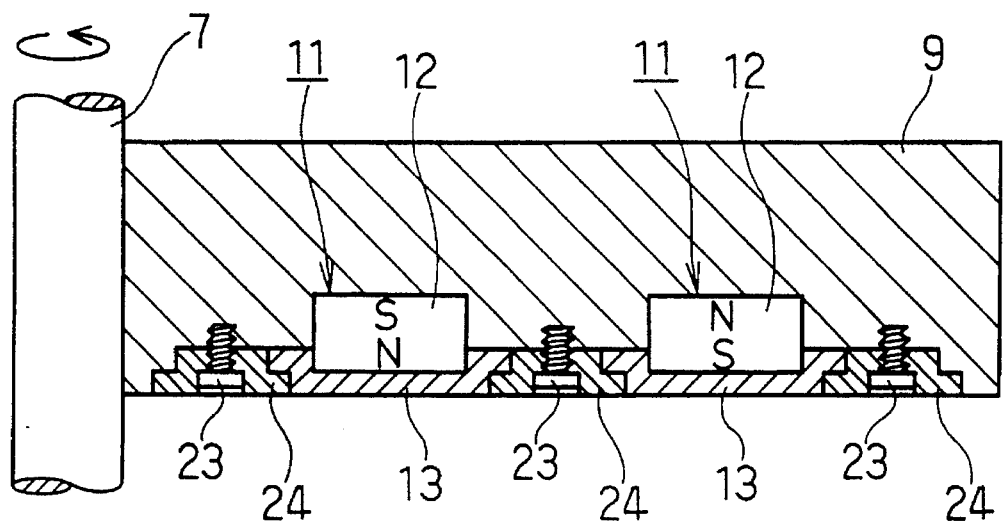
FIG. 20 is a vertical sectional view of the permanent magnet according to a fifth embodiment of this invention.

Now, a fourth embodiment of this invention will be described. The superconducting bearing 1 of this embodiment has a ring-like permanent magnet 11 and a shim 13 securely fixed to a rotor 7 as shown in FIG. 19.

Generally, the ring-like permanent magnet 11 and the shim 13 are fixed to a circular plate 9 with an adhesive or the like, but since the rotor 7 sometimes rotates at a high speed of several thousands to several ten thousands rpm, the shim 13 may be removed at such a high rotation. Therefore, in this embodiment, the width of the shim 13 is larger than the width of the ring-like permanent magnet 11, and the shim 13 and the ring-like permanent magnet 11 are fixed to the circular plate 9 by a mechanical method using screws 23. And, to fix using the screws 23, a presser plate 24 made of a non-magnetic material is used. Specifically, a step portion is formed at the end of the front face of the shim 13 opposing a superconductor 4, and the presser plate 24 is provided with a step portion for engaging with the step portion of the shim 13, so that the shim 13 is not removed from the circular plate 9 thanks to the engagement of both step portions.

Therefore, even when the circular plate 9 is rotated at a high speed, it is possible to prevent the shim 13 from being removed from the circular plate 9.

And, in case of directly fixing the shim 13 using screws, it is necessary to provide holes in the shim 13 to fix with the screws, but this is not preferable because the presence of such holes causes uneven magnetic fluxes.

A fifth embodiment of this invention will be described. The superconducting bearing 1 of this embodiment has a plurality of ring-like permanent magnets 11, 11 having different diameters disposed on a circular plate 9, and the fixing structure of the fourth embodiment is applied to these ring-like permanent magnets 11, 11.

Figure 21:
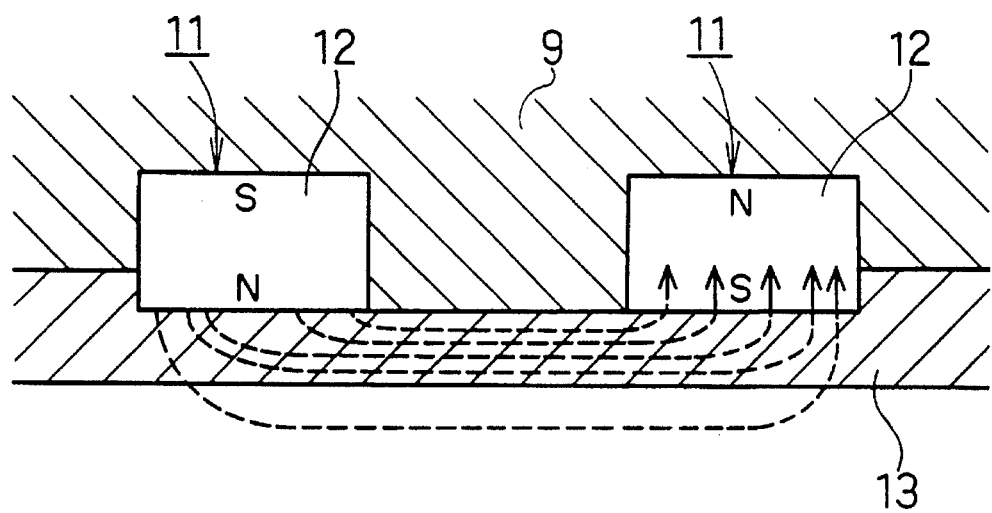
FIG. 21 is a vertical sectional view of the essential part of the permanent magnet showing the flow of magnetic fluxes within the shim according to a fifth embodiments of this invention.

As shown in FIG. 21, when the ring-like permanent magnets 11, 11 are disposed to adjacent each other and a continuous shim 13 is disposed in the surface of these ring-like permanent magnets 11, 11, magnetic fluxes flow from one ring-like permanent magnet 11 to the other ring-like permanent magnet 11 through the shim 13, so that magnetic fluxes hardly come out of the surface of the shim 13. Then, magnetic fluxes which act on the superconductor 4 are decreased and a loading force of the superconducting bearing 1 is decreased. Thus, when the continuous shim 13 shown in FIG. 21 is used, the superconducting bearing cannot be applied to a large system.

In view of the above, this embodiment disposes a non-magnetic material between the shim 13 and the adjacent ring-like permanent magnets 11, 11 to cut a magnetic path formed by the shim 13, thereby increasing the magnetic fluxes acting on the superconductor 4 from the shim 13 of the ring-like permanent magnets 11, 11. In this embodiment, each shim 13 is mechanically fixed to a circular plate 9 with screws 23 through a presser plate 24, and the presser plate 24 is made of a non-magnetic material. Therefore, the presser plate 24 disposed between the adjacent ring-like permanent magnets 11 cuts a magnetic path between the adjacent shims 13. As a result, magnetic flux quantity acting on the superconductor 4 increases, and the superconducting bearing can be applied to a large system.

This embodiment has been described with reference to a case in which the width of the shim 13 is larger than the width of the ring-like permanent magnet 11, but the width of the shim 13 may be smaller than the width of the ring-like permanent magnet 11 to enhance a gradient of magnetic fluxes.

Figure 22:
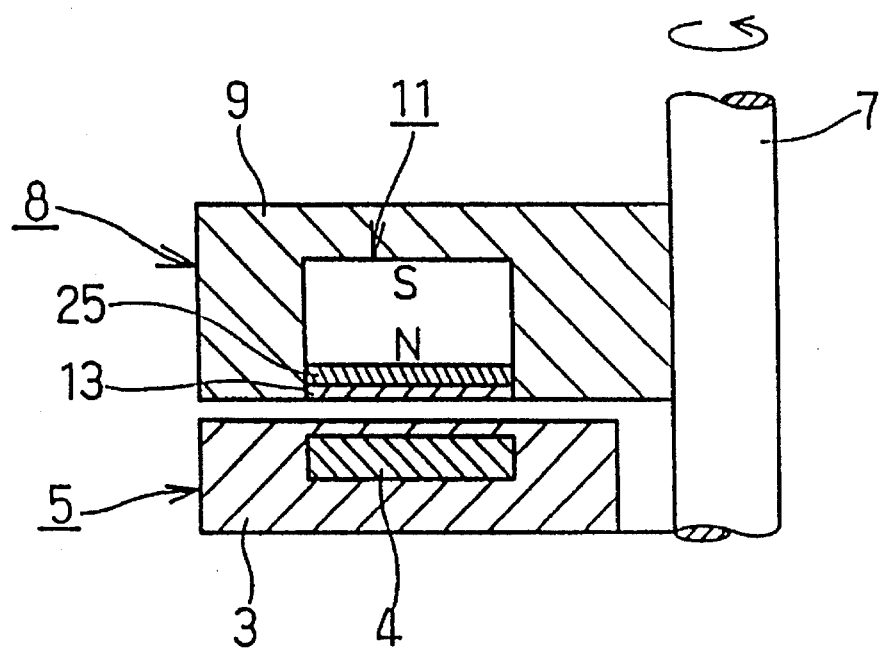
FIG. 22 is a vertical sectional view of the permanent magnet and the superconducting member according to a sixth embodiment of this invention.

A sixth embodiment of this invention will be described (FIG. 22). This embodiment disposes a non-magnetic layer 25 between a ring-like permanent magnet 11 and a shim 13 to further improve uniformity of surface magnetic flux density in the circumferential direction of a permanent magnet 8.

Figure 23:
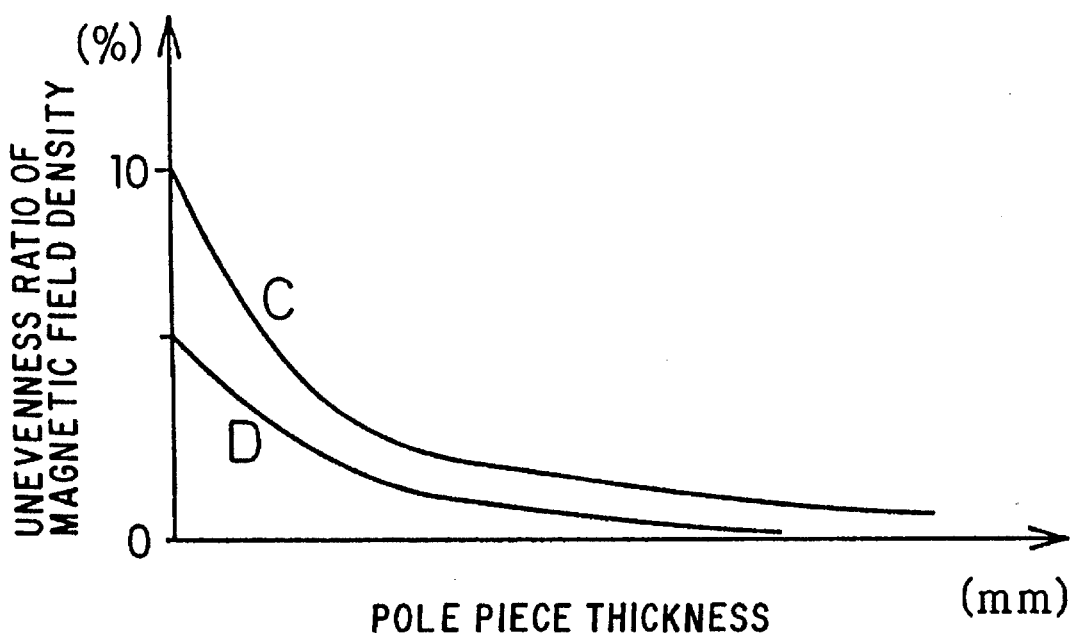
FIG. 23 is a characteristic diagram of the surface magnetic flux density in the breadth direction of the ring-like permanent magnet according to a sixth embodiment of this invention.

Specifically, when C having no non-magnetic layer between the ring-like permanent magnet 11 and the shim 13 and D having the non-magnetic layer between them are compared with reference to the test result of FIG. 23, it is seen that when the non-magnetic layer is provided, the unevenness ratio of magnetic field density in the circumferential direction of the permanent magnet 8 is decreased. In this case, the non-magnetic layer is realistically within several millimeters and may be air, resin, stainless steel, aluminum, copper or the like. And, when the shim 13 is limited to be particularly thin, the non-magnetic layer may be disposed by plating or the like.

A seventh embodiment of this invention will be described. This embodiment disposes a magnetic flux diffusion member on the surface of the ring-like magnet opposed to the superconductor, and the magnetic flux diffusion member is provided with magnetic anisotropy. The magnetic anisotropy of the magnetic flux diffusion member means that magnetic performance changes depending on directions.

In this embodiment, a shim 13 is provided with magnetic anisotropy. Specifically, magnetic resistance is increased in the radial direction within the shim 13 so as to prevent the surface magnetic flux density from decreasing while improving the uniformity of magnetic flux density in the circumferential direction.

As described above, the magnetic flux density in the circumferential direction can be made uniform by disposing the shim 13 on the surface of the ring-like permanent magnet 11, and uniformity can be further improved by making the shim 13 thick. But, when the shim 13 is thick, surface magnetic flux density is decreased as shown by characteristic I of FIG. 25. Then, as shown in FIG. 24, when the shim 13 is provided with magnetic anisotropy or a non-magnetic layer 25 for increasing magnetic resistance is disposed in the radial direction of the shim 13 in this case, uniformity of the magnetic flux density in the circumferential direction is improved while preventing the lowering of surface magnetic flux density.

Figure 24:
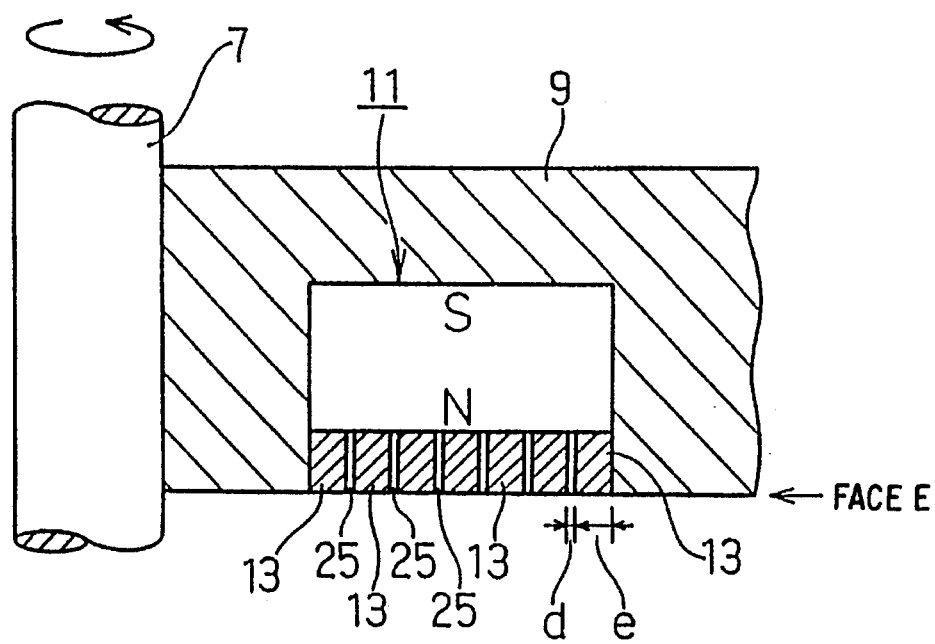
FIG. 24 is a vertical sectional view of the permanent magnet according to a seventh embodiment of this invention.
Figure 25:
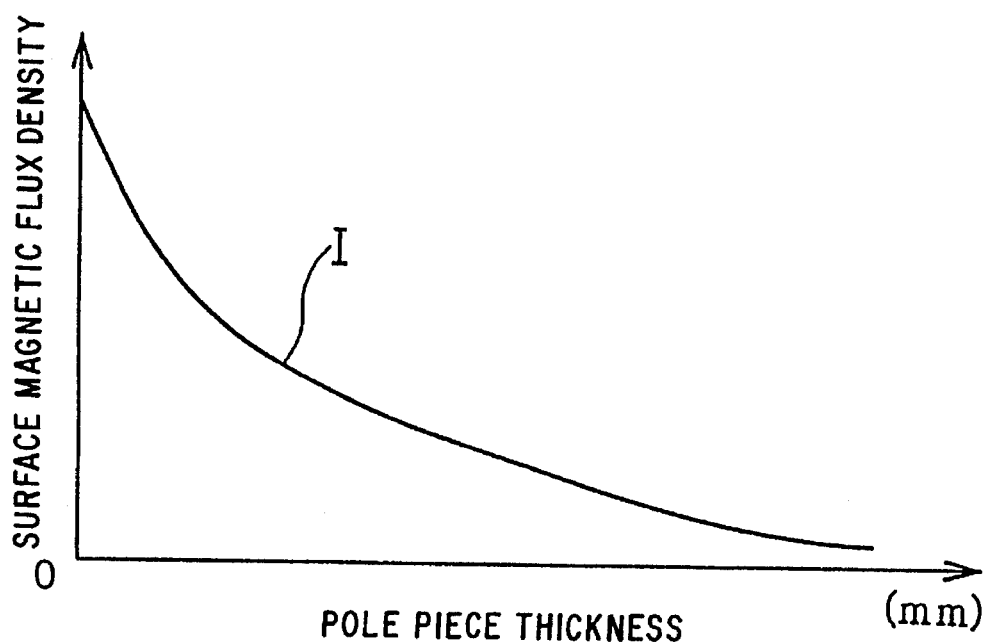
FIG. 25 is a characteristic diagram showing the relation between the surface magnetic flux density and the thickness of the shim according to a seventh embodiment of this invention.
Figure 26:
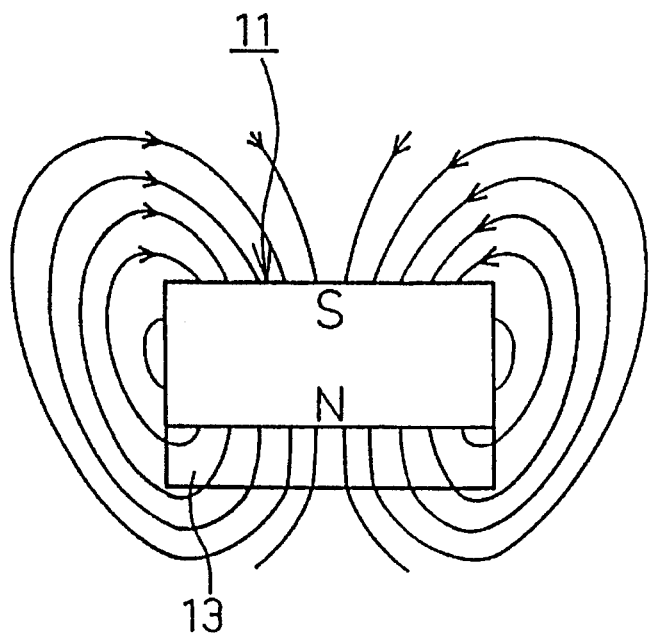
FIG. 26 is a schematic view showing the flow of magnetic fluxes according to a seventh embodiment of this invention.

In FIG. 24, 11 represents the ring-like permanent magnet and 11 the shim. The shim 13 has the non-magnetic layer 25 disposed at certain intervals in the radial direction. Each non-magnetic layer 25 is formed of a non-magnetic material such as resin, aluminum or air, and six non-magnetic layers are disposed annularly. Therefore, shim 13 is formed of seven rings. In the drawing, e is a parting width of the shim 13 and d is a width of the non-magnetic layer 25. And, a magnetic material having a magnetic permeability of 1000 or more is used for the shim 13, and the non-magnetic layer generally has a magnetic permeability of about 1, so that the non-magnetic layer has a very low magnetic permeability as compared with the shim 13, and the flow of magnetic fluxes in the radial direction within the shim 13 is very poor. As a result, the magnetic fluxes from the ring-like permanent magnet 11 easily flow in the circumferential direction within the shim 13 but do not flow easily in the radial direction, and magnetic flux quantity generated from the shim 13 to the surface increases.

Figure 27:
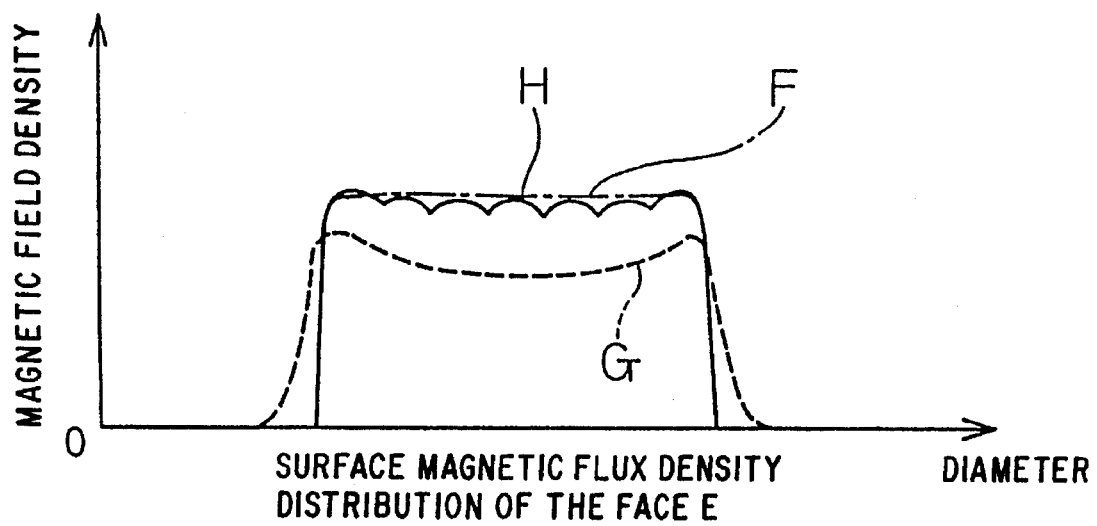
FIG. 27 is a distribution characteristic diagram of the surface magnetic flux density according to a seventh embodiment of this invention.

Specifically, as compared with a case where the shim 13 is on the surface of the ring-like permanent magnet 11, when the shim 13 is on it, the magnetic fluxes from N pole of the ring-like permanent magnet 11 return to S pole through the shim 13, so that the magnetic fluxes generated on the surface of the shim 13 are decreased. This is because the magnetic fluxes easily flow in the radial direction within the shim 13. FIG. 27 shows the surface magnetic flux distribution on face E which is also the surface of the shim 13 in FIG. 24 with respect to a case where the permanent magnet 11 is disposed without the shim 13 (characteristic F), a case where the shim 13 is disposed without the non-magnetic layer 25 (characteristic G), and a case where the shim 13 is disposed with the non-magnetic layer 25 (characteristic H). The shim 13 without the non-magnetic layer 25 (characteristic G) shows a decreased magnetic flux density as compared with the case without the shim 13 (characteristic F), and the shim 13 with the non-magnetic layer 25 (characteristic H) shows a magnetic flux density which is almost equal to the case without the shim 13 (characteristic F). In this case, since the shim 13 is provided with six layered non-magnetic layer 25, uneven pulse is generated in the radial direction as the surface magnetic flux distribution characteristic of the face E, but magnetic flux density is uniform in the revolving direction or circumferential direction. Therefore, uniformity of magnetic flux density in the circumferential direction is fully secured, and lowering of magnetic flux density can be prevented while improving uniformity of magnetic flux density in the circumferential direction.

Figure 28:
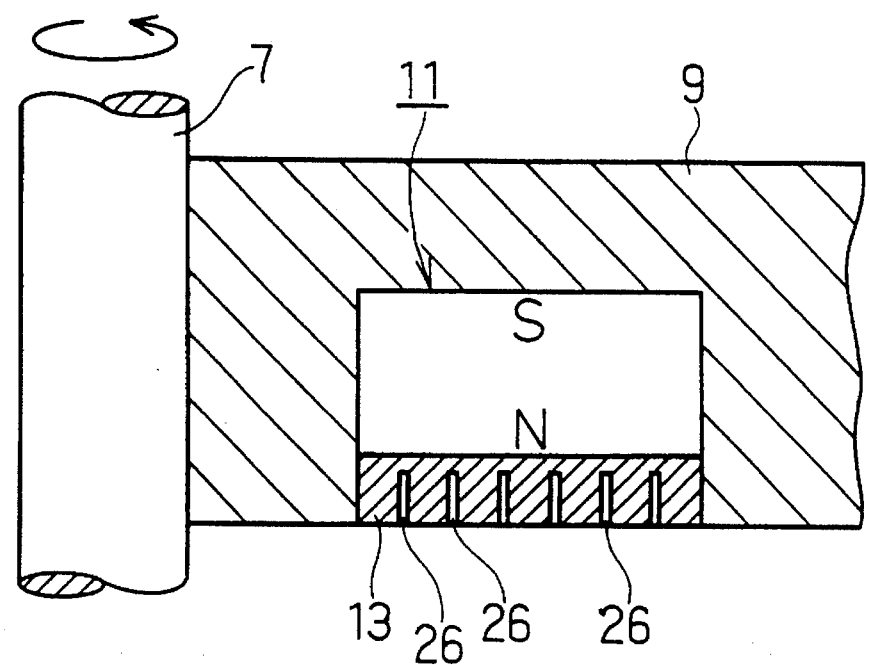
FIG. 28 is a vertical sectional view showing another embodiment of the permanent magnet according to a seventh embodiment of this invention.

As the non-magnetic layer 25 to be disposed on the shim 13, the same effect as described above can be exhibited by disposing the non-magnetic layer 26 so as to have a cross section in the shape of comb teeth by remaining the portion of the shim 13 on the side of the ring-like permanent magnet 11 as shown in FIG. 28 without disposing it to cut the shim 13 in the radial direction. In this case, magnetic fluxes flow within the shim 13 in the proximity of the ring-like permanent magnet 11, but since the shim 13 is saturated, the flowing magnetic fluxes are partial, and most of magnetic fluxes are generated from the surface of the shim 13.

And, the number of layers of the non-magnetic layer 25 and the ratio of size between the parting width e of the shim 13 and the width d of the non-magnetic layer 25 may be optionally set depending on the shape of the ring-like permanent magnet 11.

Further, the six layered non-magnetic layer and the shim shown in the embodiment have been equally divided into six layers, but the ratio of these non-magnetic layer and the shim may be changed in the radial direction.

An eighth embodiment of this invention will be described. In this embodiment, surface magnetic flux density is improved by changing the cross-sectional shape of a ring-like permanent magnet 11 as shown in FIG. 29, FIG. 30 and FIG. 31.

Figure 29:
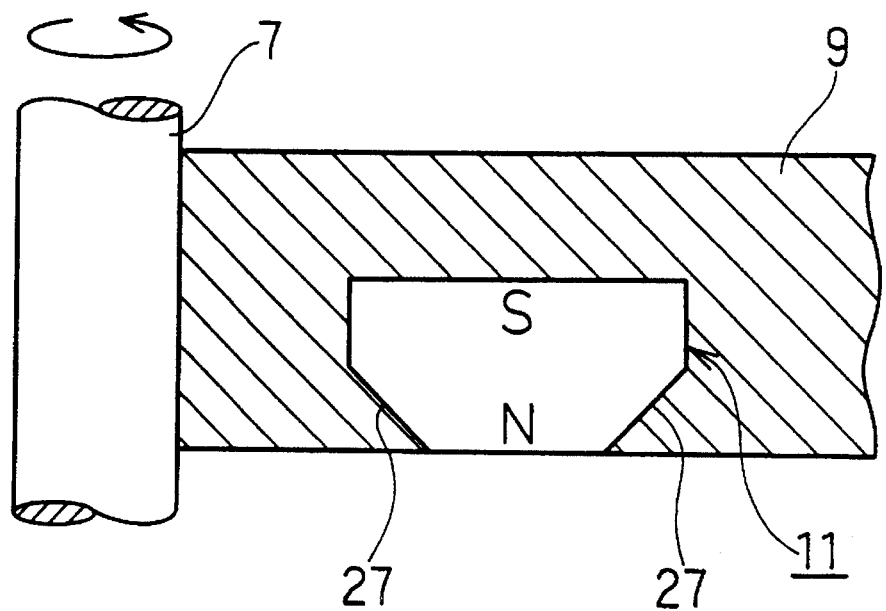
FIG. 29 is a vertical sectional view of the permanent magnet according to an eighth embodiment of this invention.

In FIG. 29, the width in the radial direction of the surface of the ring-like magnet opposing to the superconducting member is formed to be almost equal to the width in the radial direction of the front face of the superconducting member opposing to the ring-like magnet, and the width in the radial direction of the back face of the ring-like magnet is formed to be larger than the width in the radial direction of the front face of the ring-like magnet.

Specifically, in this embodiment, the width of the front face of the ring-like permanent magnet 11 is almost the same with the width of the superconductor 4 as described above, and the back face or the opposite face of the ring-like permanent magnet 11 is largely formed in the circumferential direction with respect to the width of the front face of the ring-like permanent magnet 11. Thus, magnetic fluxes from the ring-like permanent magnet 11 are concentrated on the front face from the back face, extensively improving the front face magnetic flux density.

Figure 30:
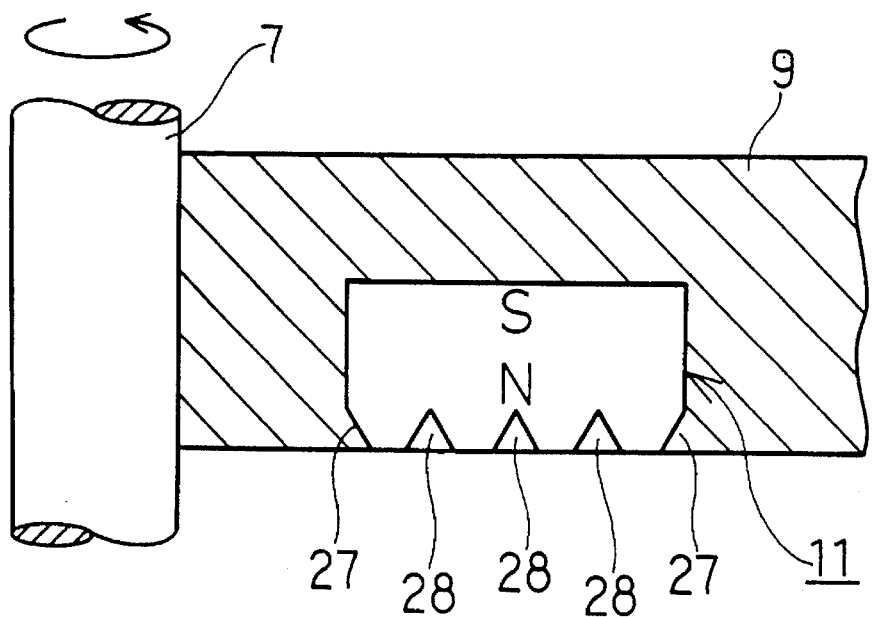
FIG. 30 is a vertical sectional view showing another embodiment of the permanent magnet according to an eighth embodiment of this invention.
Figure 31:
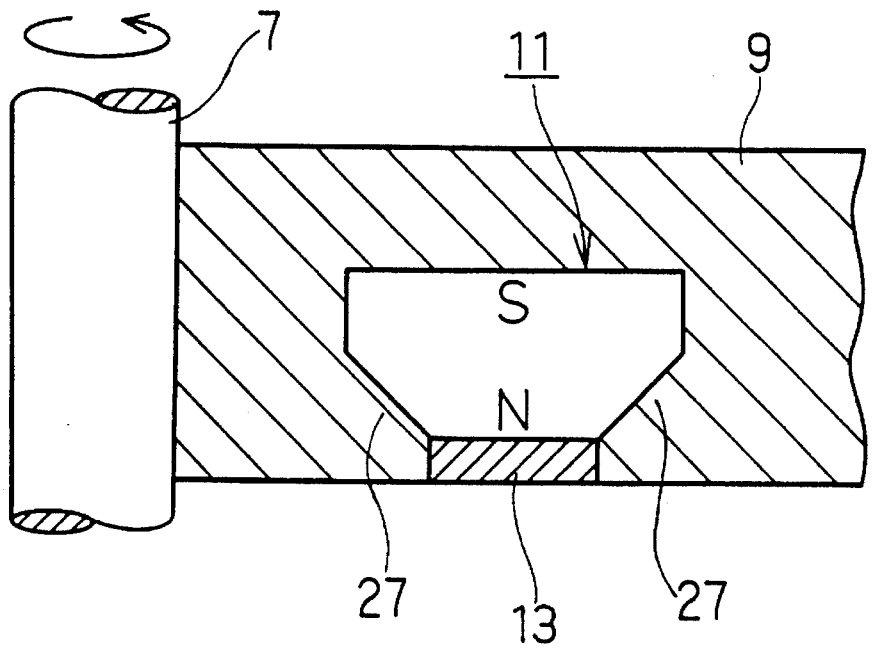
FIG. 31 is a vertical sectional view showing another embodiment of the permanent magnet according to an eighth embodiment of this invention.

FIG. 30 shows a cross sectional structure having corrugations formed in the radial direction on the front face of the ring-like permanent magnet 11 having the shape shown in FIG. 29. In this embodiment, three grooves 28 having the cross-sectional shape of a triangle are disposed in the circumferential direction. Therefore, four crests ranging in the circumferential direction and having different diameters are formed on the front face of the ring-like permanent magnet 11. In this case, magnetic fluxes are concentrated on the front face of the magnet, so that the same effect of extensively improving the front face magnetic flux density can be obtained. The number of corrugations and the shape of crests can be determined as desired.

FIG. 31 shows the shim 13 made of a magnetic material disposed on the front face of the ring-like permanent magnet 11 having the shape shown in FIG. 29. Disposing the shim 13 makes it possible to improve the front face magnetic flux density and to make the front face magnetic flux density uniform.

In FIG. 29, FIG. 30 and FIG. 31 described above, description has been made using one ring-like permanent magnet 11, but the same effect can be obtained by multiplying the ring-like permanent magnet 11.

The effect of making the front face magnetic flux density uniform by the shim 13 has been mainly described, the shim attached to the magnet surface has another effect that irreversible demagnetization can be prevented. Specifically, when the magnet has got a floating force by the pinning effect of the superconductor and the magnet is driven to rotate, a high demagnetization field acts on the magnet. And, when the thickness of the magnet in the magnetization direction is thin and the permeance of the magnet is small, irreversible demagnetization may be caused by the demagnetization field. But, the aforementioned shim works to disperse the demagnetization field, to prevent the concentration of the magnetic flux density, and to prevent the irreversible demagnetization.

Figure 32:
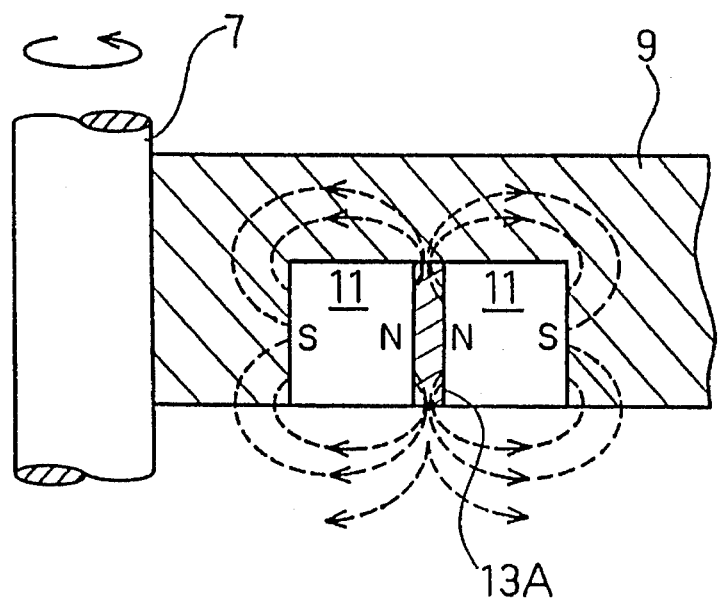
FIG. 32 is a vertical sectional view showing the permanent magnet according to a ninth embodiment of this invention.

A ninth embodiment of this invention will be described. This embodiment aims to improve the magnetic field intensity when the ring-like permanent magnets 11, 11 disposed adjacent to each other and magnetized in the radial direction are used. Specifically, as shown in FIG. 32, the ring-like permanent magnets 11, 11 having different diameters and magnetized in the radial direction are disposed, and a magnetic ring 13A made of a soft magnetic material is held between the ring-like permanent magnets 11, 11. And the ring-like permanent magnet 11 on the inner periphery and the ring-like permanent magnet 11 on the outer periphery are disposed to oppose the same poles with the magnetic ring 13A therebetween.

In such a structure, the magnetic fluxes from N pole of the ring-like permanent magnets 11, 11 pass through the magnetic ring 13A as shown by the arrows in FIG. 32, appear on the front face of the ring-like permanent magnets 11, 11, and return to S pole of each ring-like permanent magnets 11. In this case, the magnetic fluxes from each ring-like permanent magnets 11 are gathered by the magnetic ring 13A, so that the magnetic flux density on the front face of the ring-like permanent magnets 11 is increased sharply.

Figure 33:
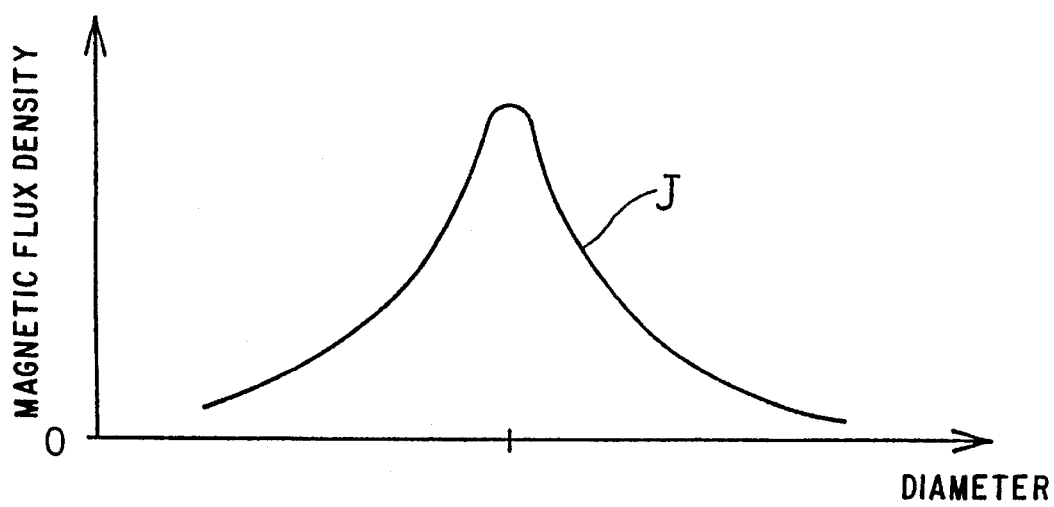
FIG. 33 is a characteristic diagram showing the surface magnetic flux density according to a ninth embodiment of this invention.

In this case, the surface magnetic flux distribution shows that the magnetic flux density increases in the vicinity of the surface of the magnetic ring 13A as shown by characteristic J of FIG. 33. The magnitude of the peak of the magnetic flux density and the width of the peak can be changed as desired by changing the width in the radial direction of the magnetic ring.

Thus, in this embodiment, the peak of the magnetic flux density can be increased, but as an effect other than this, the magnetic flux in the circumferential direction is made uniform by the magnetic ring 13A, so that the aforementioned role of the shim can be fulfilled. In particular, the magnetic ring 13A of this embodiment is different from the aforementioned shim and can have a thickness almost the same with the ring-like permanent magnet 11, so that the uniformity of the magnetic fluxes in the circumferential direction in be improved extensively. And, since the magnetic poles of the ring-like permanent magnets 11, 11 disposed adjacent to each other with the magnetic ring 13A therebetween are the same, a repulsion force of the ring-like permanent magnets 11, 11 is weakened very much, and assembling can be made easily even when assembling a large-sized ring-like permanent magnet 11.

This embodiment has been described using two ring-like permanent magnets 11, but the same effect can be obtained by disposing the adjacent ring-like permanent magnets 11 to oppose the same poles and disposing the magnetic ring 13A among them even when the ring-like permanent magnets 11 are disposed in multiple (four-ply).

A tenth embodiment of this invention will be described. In the aforementioned first embodiment, the superconducting bearing 1 received the entire load of the rotor 7 in the axial direction, but the superconducting bearing 1 of this embodiment has the ring-like permanent magnet 11 and the superconductor 4 disposed to oppose each other in the radial direction of the rotor 7. In this embodiment, the ring-like permanent magnet 11 and the superconductor 4 are disposed to oppose each other in the radial direction of the rotor 7, so that operation can be made even when the ring-like permanent magnet 11 and the superconductor 4 cannot be disposed in the axial direction, thus the superconducting bearing 1 can have a flat structure as the whole. And, a force supporting the rotor from the periphery is enhanced, and as a result, the axial falling and the eccentric rotation of the rotor 7 can be surely prevented.

And, in addition to the disposition to oppose the ring-like permanent magnet 11 and the superconductor 4 in the radial direction, the disposition of the ring-like permanent magnet 11 and the superconductor 4 opposing in the radial direction as in the first embodiment can be combined, and by structuring like this, both effects can be obtained. And the ring-like permanent magnet 11 is not limited to be disposed in a single but may be disposed coaxially in plural.

Figure 36:
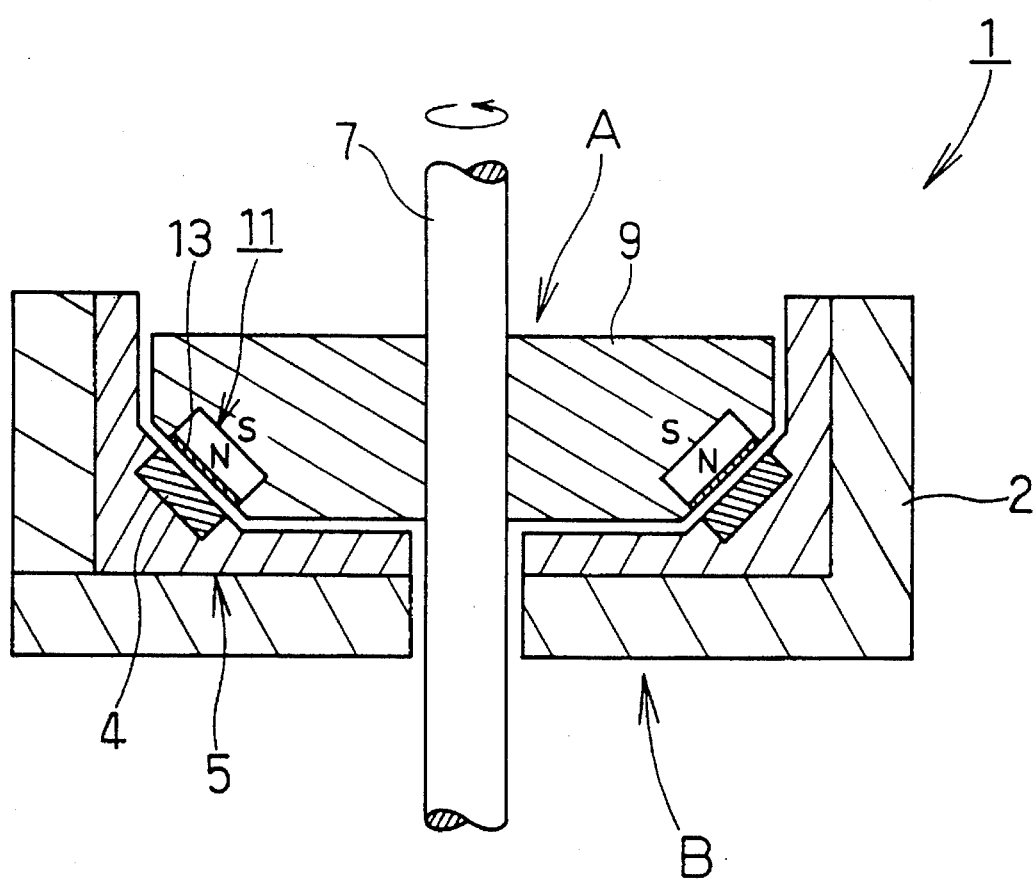
FIG. 36 is a vertical sectional view showing the superconducting bearing according to an eleventh embodiment of this invention.

An eleventh embodiment of this invention will be described. In this embodiment, the ring-like permanent magnet 11 and the superconductor 4 are disposed to oppose each other keeping a certain angle with respect to the axis of the rotor 7, and a supporting force in the radial direction and the axial direction of the rotor 7 is served by the minimum pair of ring-like permanent magnet 11 and superconductor 4 as shown in FIG. 36. Therefore, in this embodiment, the ring-like permanent magnet 11 is disposed at the lower corner of the circular plate 9, and the superconductor 4 is disposed on the housing 2 so as to oppose at an angle of about 45 degrees to the axis of the rotor 7 as shown in FIG. 36. Therefore, by the minimum pair of ring-like permanent magnet 11 and superconductor 4, a weight of the rotor 7 can be supported, and the axial falling and the eccentric rotation of the rotor 7 can be surely prevented. And the ring-like permanent magnet 11 is not limited to be disposed in a single but may be disposed coaxially in plural.

A twelfth embodiment of this invention will be described. In this embodiment, to further improve the stability of the superconducting bearing 1 as a bearing, a ring-like permanent magnet is used together so as to enhance a supporting force in both directions of the axial and circumferential directions.

Figure 37:
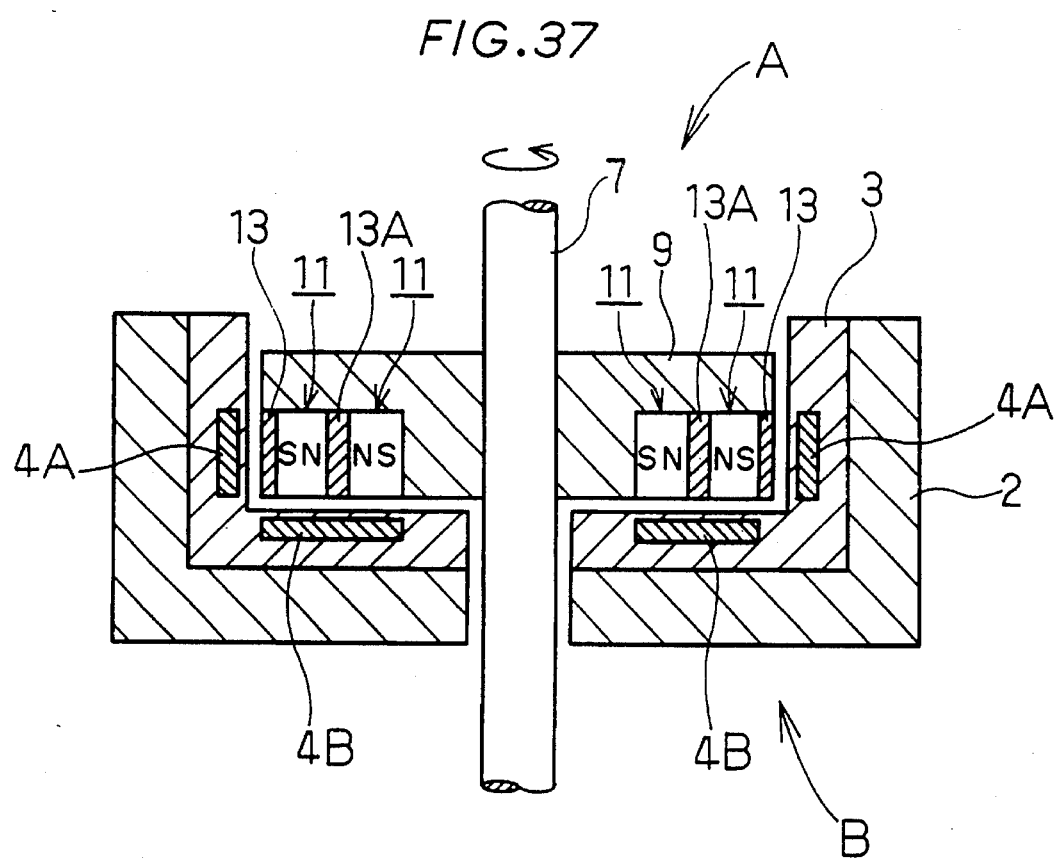
FIG. 37 is a vertical sectional view showing the superconducting bearing according to a twelfth embodiment of this invention.
Figure 38:
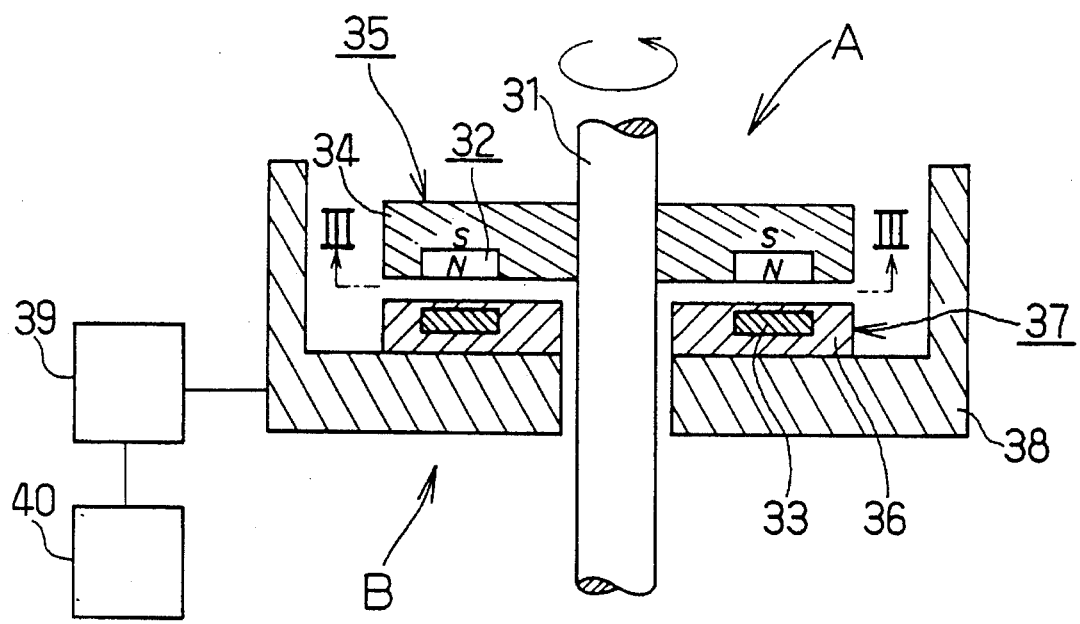
FIG. 38 is a vertical sectional view of the superconducting bearing according to prior art.

Specifically, in this embodiment, a plurality of ring-like permanent magnets 11, 11 is disposed to adjoin each other so that the ring-like permanent magnets 11 are opposed to each other in the radial direction of the superconductor 4 and the rotor 7, and the adjacent ring-like permanent magnets 11, 11 have the same poles opposed to each other, and with respect to these ring-like permanent magnets 11, 11, superconductors 4A and 4B are disposed to oppose in the radial and axial directions as shown in FIG. 37.

Figure 34:
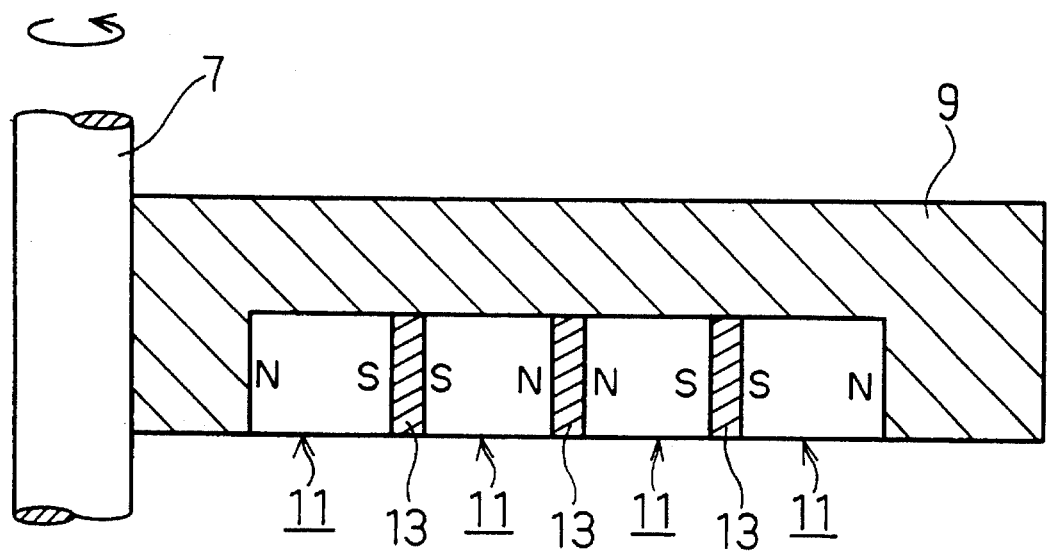
FIG. 34 is a vertical sectional view showing another embodiment of the permanent magnet according to a ninth embodiment of this invention.
Figure 35:
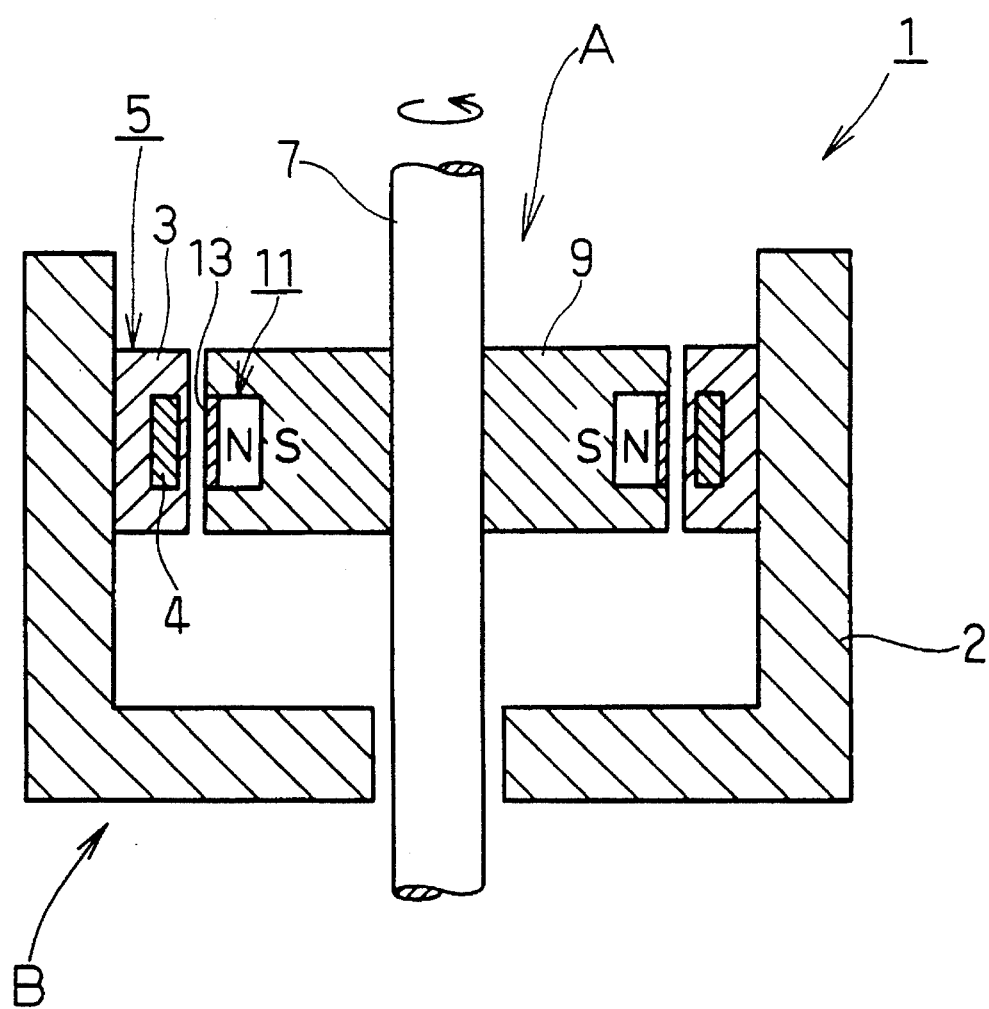
FIG. 35 is a vertical sectional view showing the superconducting bearing according to a tenth embodiment of this invention.

And, the plurality of ring-like permanent magnets 11, 11 is disposed as shown in FIG. 32 and FIG. 34 described above, and on the surface of the ring-like permanent magnet 11 facing the superconductor 4A in the radial direction is disposed the shim 13, and the aforementioned magnetic ring 13A is held between the ring-like permanent magnets 11.

Therefore, a radial bearing is structured by the superconductor 4A, the shim 13 and the ring-like permanent magnet 11 opposing in the radial direction, and a thrust bearing is structured by the superconductor 4B, the ring-like permanent magnet 11 and the magnetic ring 13A opposing in the axial direction, and the ring-like permanent magnets 11, 11 can be served for both bearings. As a result, the number of parts can be decreased, and a supporting force in both directions of the axial and circumferential direction is enhanced, thus the axial falling and the eccentric rotation of the rotor 7 can be prevented, and an excellent effect is exhibited in a loading force. Thus, the superconducting bearing suitable for a large system can be realized.

In the above first to twelfth embodiments, the superconducting bearing described has the superconducting member 5 disposed on the fixed member B and the magnet 8 disposed on the rotating member A, but the same effect can be obtained by disposing the superconducting member 5 on the rotating member A and the magnet 8 on the fixed member B. In the embodiments, a Pr magnet has been used as the magnet but this invention is not limited to it, and it is to be understood that any other permanent magnets can be used. Further, anything such as electromagnet and superconducting coil which generate magnetic fluxes can be applied. In addition, the superconductor itself in which magnetic fluxes are confined by the pinning effect can be used as the magnet disposed on the rotating member and the fixed member.

INDUSTRIAL APPLICABILITY

As described above, this invention can be applied to a fluid machine or machine tool which needs a high speed rotation, a power storage device which reserves an excess power by converting it into the kinetic energy of a fly wheel, and particularly a large-size system which needs a loading force.

We claim:

1. A superconducting bearing comprising a rotating member and a fixed member, one of which is provided with a superconducting member while the other is provided with a magnet, the superconducting member including a superconductor for floating the magnet and a support for supporting the superconductor, the magnet including a plurality of ring-like magnets which are coaxial with the axis of the rotating member, and the ring-like magnets and the superconductor member being so disposed as to face each other with a gap between them, characterized by disposing a magnetic flux diffusion members in the same number with the ring-like magnets to oppose the superconducting member and disposing a non-magnetic section between one of the magnetic flux diffusion members and the adjacent magnetic flux diffusion member.

2. A superconducting bearing according to claim 1 wherein the non-magnetic section is a presser plate disposed between the adjacent ring-like magnets and the adjacent magnetic flux diffusion members are fixed by the presser plate.

3. A superconducting bearing according to claim 1 or 2 wherein at least one of the ring-like magnets is structured by adjoining a plurality of permanent magnets in the circumferential direction.

4. A superconducting bearing according to claim 1 wherein the non-magnetic section is a presser plate to fix the magnetic flux diffusion member.

5. A superconducting bearing comprising a rotating member and a fixed member, one of which is provided with a superconducting member while the other is provided with a magnet, the superconducting member including a superconductor for floating the magnet and a support for supporting the superconductor, the magnet including a ring-like magnet which is coaxial with the axis of the rotary member, and the ring-like magnet and the superconductor member being so disposed as to face each other with a gap between them, characterized by forming the ring-like magnet by adjoining two ring-like magnets having different diameters, and magnetizing this pair of ring-like magnets to face the directions of magnetic fluxes slantingly with one another.

6. A superconducting bearing comprising a rotating member and a fixed member, one of which is provided with a superconducting member while the other is provided with a magnet, the superconducting member including a superconductor for floating the magnet and a support for supporting the superconductor, the magnet including a ring-like magnet which is coaxial with the axis of the rotary member, and the ring-like magnet and the superconductor member being so disposed as to face each other with a gap between them, characterized by forming the ring-like magnet by adjoining two ring-like magnets having different diameters, each ring-like magnet consisting of a plurality of magnets joined in the circumferential direction, magnetizing this pair of two ring-like magnets to face the directions of magnetic fluxes slantingly with one another, and disposing a magnetic flux diffusion member on the surface of the pair of ring-like magnets opposed to the superconductor.

7. A superconducting bearing comprising a rotating member and a fixed member, one of which is provided with a superconducting member while the other is provided with a magnet, the superconducting member including a superconductor for floating the magnet and a support for supporting the superconductor, the magnet including a ring-like magnet which is coaxial with the axis of the rotary member, and the ring-like magnet and the superconductor member being so disposed as to face each other with a gap between them, characterized by disposing a magnetic flux diffusion member on the surface of the ring-like magnet opposed to the superconductor, and disposing a non-magnetic layer between the ring-like magnet and the magnetic flux diffusion member.

8. A superconducting bearing comprising a rotating member and a fixed member, one of which is provided with a superconducting member while the other is provided with a magnet, the superconducting member including a superconductor for floating the magnet and a support for supporting the superconductor, the magnet including a ring-like magnet which is coaxial with the axis of the rotary member, and the ring-like magnet and the superconductor member being so disposed as to face each other with a gap between them, characterized by disposing a magnetic flux diffusion member on the surface of the ring-like magnet opposed to the superconductor, this magnetic flux diffusion member being provided with magnetic anisotropy.

9. A superconducting bearing according to claim 8 wherein a magnetic resistance layer is disposed to increase magnetic resistance in the radial direction within the magnetic flux diffusion member so as to provide the magnetic flux diffusion member with magnetic anisotropy.

10. A superconducting bearing comprising a rotating member and a fixed member, one of which is provided with a superconducting member while the other is provided with a magnet, the superconducting member including a superconductor for floating the magnet and a support for supporting the superconductor, the magnet including a ring-like magnet which is coaxial with the axis of the rotary member, and the ring-like magnet and the superconductor member being so disposed as to face each other with a gap between them, characterized by making the width in the radial direction of the surface of the ring-like magnet opposing to the superconducting member to be substantially equal to the width in the radial direction of the surface of the superconducting member opposing to the ring-like magnet, and making the width in the radial direction of the back face of the ring-like magnet to be greater than the width in the radial direction of the surface of the ring-like magnet.

11. A superconducting bearing according to claim 10 wherein a groove is disposed along the circumferential direction on a side opposing to the superconducting member of the ring-like magnet.

12. A superconducting bearing according to claim 10 or 11 wherein a magnetic flux diffusion member is disposed on the opposing face of the ring-like magnet.

13. A superconducting bearing comprising a rotating member and a fixed member, one of which is provided with a superconducting member while the other is provided with a magnet, the superconducting member including a superconductor for floating the magnet and a support for supporting the superconductor, the magnet including a ring-like magnet which is coaxial with the axis of the rotary member, and the ring-like magnet and the superconductor member being so disposed as to face each other with a gap between them, characterized by disposing at least two ring-like magnets, which have different diameters and are magnetized in the radial direction, as the ring-like magnet, and disposing an air layer or solid member between the adjacent ring-like magnets, wherein said solid member is made of a magnetic material.

14. A superconducting bearing comprising a rotating member and a fixed member, one of which is provided with a superconducting member while the other is provided with a magnet, the superconducting member including a superconductor for floating the magnet and a support for supporting the superconductor, the magnet including a ring-like magnet which is coaxial with the axis of the rotating member, and the ring-like magnet and the superconductor member being so disposed as to face each other with a gap between them, characterized by disposing a magnetic flux diffusion member to oppose the superconducting member, and between the superconductor of the superconducting member and the rotating member provided with the ring-like magnet, penetrating magnetic fluxes flow from the ring-like magnet into the superconductor through the magnetic flux diffusion member so that the floating rotating member rotate with the ring-like magnet restrained by the superconductor.

15. A superconducting bearing comprising a rotating member and a fixed member, one of which is provided with a superconducting member while the other is provided with a magnet, the superconducting member including a superconductor for floating the magnet and a support for supporting the superconductor, the magnet including a ring-like magnet which is coaxial with the axis of the rotary member, and the ring-like magnet and the superconductor member being so disposed as to face each other with a gap between them, characterized by disposing a magnetic flux diffusion member to oppose the superconducting member and having the ring-like magnet structured by adjoining a plurality of permanent magnets in the circumferential direction.

* * * * *